US010380653B1

(12) United States Patent
Flint et al.

(10) Patent No.: US 10,380,653 B1
(45) Date of Patent: Aug. 13, 2019

(54) VALUATION SYSTEM

(75) Inventors: Pete Flint, San Francisco, CA (US);
Jesper Sparre Andersen, San Francisco, CA (US); Sami Inkinen, San Francisco, CA (US)

(73) Assignee: Trulia, LLC, Seattle, WA (US)

( * ) Notice: Subject to any disclaimer, the term of this patent is extended or adjusted under 35 U.S.C. 154(b) by 330 days.

(21) Appl. No.: 12/924,037

(22) Filed: Sep. 16, 2010

(51) Int. Cl.
*G06Q 30/02* (2012.01)

(52) U.S. Cl.
CPC ................................ *G06Q 30/0278* (2013.01)

(58) Field of Classification Search
USPC ................................................ 705/313, 303
See application file for complete search history.

(56) References Cited

U.S. PATENT DOCUMENTS

| | | | |
|---|---|---|---|
| 4,870,576 A | | 9/1989 | Tornetta |
| 5,361,201 A | * | 11/1994 | Jost et al. ........................ 705/35 |
| 5,414,621 A | | 5/1995 | Hough |
| 5,584,025 A | * | 12/1996 | Keithley et al. ............... 707/752 |
| 5,680,305 A | | 10/1997 | Apgar, IV |
| 5,754,850 A | | 5/1998 | Janssen |
| 5,794,216 A | | 8/1998 | Brown |
| 5,855,011 A | | 12/1998 | Tatsuoka |
| 5,857,174 A | | 1/1999 | Dugan |
| 6,115,694 A | | 9/2000 | Cheetham et al. |
| 6,178,406 B1 | | 1/2001 | Cheetham et al. |
| 6,240,425 B1 | | 5/2001 | Naughton |
| 6,260,033 B1 | | 7/2001 | Tatsuoka |
| 6,301,571 B1 | | 10/2001 | Tatsuoka |
| 6,397,208 B1 | | 5/2002 | Lee |
| 6,401,070 B1 | | 6/2002 | McManus et al. |
| 6,446,261 B1 | | 9/2002 | Rosser |
| 6,493,721 B1 | | 12/2002 | Getchius et al. |
| 6,597,983 B2 | | 7/2003 | Hancock |
| 6,609,118 B1 | | 8/2003 | Khedkar et al. |
| 6,615,187 B1 | | 9/2003 | Ashenmil |
| 6,760,707 B2 | | 7/2004 | Provost |
| 6,876,955 B1 | * | 4/2005 | Fleming ................. G06Q 30/06 702/181 |
| 6,877,015 B1 | | 4/2005 | Kilgore et al. |

(Continued)

FOREIGN PATENT DOCUMENTS

| | | |
|---|---|---|
| EP | 1903491 A1 | 3/2008 |
| WO | WO-9524687 | 3/1995 |

(Continued)

OTHER PUBLICATIONS

Elli Pagourtzi, Vassilis Assimakopoulos, Thomas Hatzichristos, Nick French, (2003) "Real estate appraisal: a review of valuation methods", Journal of Property Investment & Finance, vol. 21 Issue: 4, pp. 383-401, https://doi.org/10.1108/14635780310483656 (Year: 2003).*

(Continued)

Primary Examiner — Andrew B Whitaker
(74) Attorney, Agent, or Firm — Perkins Coie LLP

(57) ABSTRACT

Estimating a valuation of a target property is disclosed, including receiving user-generated data regarding one or more properties associated with the target property, processing the user-provided data using one or more data models that are configured to process the user-provided data, and combining the output of the one or more data models to obtain an estimated valuation of the target property.

17 Claims, 10 Drawing Sheets

(56) References Cited

U.S. PATENT DOCUMENTS

| | | |
|---|---|---|
| 6,915,206 B2 | 7/2005 | Sasajima |
| 7,092,918 B1 | 8/2006 | Delurgio et al. |
| 7,120,599 B2 | 10/2006 | Keyes |
| 7,130,810 B2 | 10/2006 | Foster et al. |
| 7,219,078 B2 | 5/2007 | Lamont et al. |
| 7,249,146 B2 | 7/2007 | Brecher |
| 7,289,965 B1 | 10/2007 | Bradley et al. |
| 7,454,355 B2 | 11/2008 | Milman et al. |
| 7,461,265 B2 | 12/2008 | Ellmore |
| 7,487,114 B2 | 2/2009 | Florance et al. |
| 7,567,262 B1 | 7/2009 | Clemens et al. |
| 7,711,574 B1 | 5/2010 | Bradley et al. |
| 7,725,359 B1 | 5/2010 | Katzfey et al. |
| 7,783,562 B1 | 8/2010 | Ellis |
| 7,788,186 B1 | 8/2010 | An et al. |
| 7,827,128 B1 | 11/2010 | Yan et al. |
| 7,848,966 B2 | 12/2010 | Charuk et al. |
| 7,933,798 B1 | 4/2011 | Yan et al. |
| 7,970,674 B2 | 6/2011 | Cheng et al. |
| 8,001,024 B2 | 8/2011 | Graboske et al. |
| 8,032,401 B2 | 10/2011 | Choubey |
| 8,051,089 B2 | 11/2011 | Gargi et al. |
| 8,095,434 B1 | 1/2012 | Puttick et al. |
| 8,140,421 B1 | 3/2012 | Humphries et al. |
| 8,180,697 B2 | 5/2012 | Frischer |
| 8,190,516 B2 | 5/2012 | Ghosh et al. |
| 8,370,267 B2 | 2/2013 | Carey et al. |
| 8,401,877 B2 | 3/2013 | Salvagio |
| 8,473,347 B1 | 6/2013 | Koningstein |
| 8,521,619 B2 | 8/2013 | Perry, III et al. |
| 8,583,562 B1 | 11/2013 | McDaniel et al. |
| 8,628,151 B1 | 1/2014 | Allen et al. |
| 8,650,067 B1 | 2/2014 | Moss |
| 8,660,919 B2 | 2/2014 | Kasower |
| 8,676,680 B2 | 3/2014 | Humphries et al. |
| 8,775,300 B2 | 7/2014 | Showalter |
| 9,536,011 B1 | 1/2017 | Kirillov |
| 9,605,704 B1 | 3/2017 | Humphries et al. |
| 2001/0039506 A1 | 11/2001 | Robbins |
| 2001/0044766 A1 | 11/2001 | Keyes |
| 2002/0007336 A1 | 1/2002 | Robbins |
| 2002/0035520 A1 | 3/2002 | Weiss |
| 2002/0082903 A1 | 6/2002 | Yasuzawa |
| 2002/0087389 A1 | 7/2002 | Sklarz et al. |
| 2002/0188689 A1 | 12/2002 | Michael |
| 2003/0004781 A1 | 1/2003 | Mallon et al. |
| 2003/0046099 A1 | 3/2003 | Lamont et al. |
| 2003/0078878 A1 | 4/2003 | Opsahl-Ong |
| 2003/0078897 A1 | 4/2003 | Florance et al. |
| 2003/0101063 A1 | 5/2003 | Sexton et al. |
| 2003/0101074 A1 | 5/2003 | Suzuki et al. |
| 2003/0110122 A1 | 6/2003 | Nalebuff et al. |
| 2003/0149658 A1 | 8/2003 | Rossbach et al. |
| 2003/0191723 A1 | 10/2003 | Foretich et al. |
| 2003/0212565 A1 | 11/2003 | Badali et al. |
| 2004/0019517 A1 | 1/2004 | Sennott |
| 2004/0030616 A1 | 2/2004 | Florance et al. |
| 2004/0039629 A1 | 2/2004 | Hoffman et al. |
| 2004/0049440 A1 | 3/2004 | Shinoda et al. |
| 2004/0054605 A1 | 3/2004 | Whittet |
| 2004/0073508 A1 | 4/2004 | Foster et al. |
| 2004/0093270 A1 | 5/2004 | Gilbert |
| 2004/0128215 A1 | 7/2004 | Florance et al. |
| 2004/0153330 A1 | 8/2004 | Miller et al. |
| 2004/0220872 A1 | 11/2004 | Pollock |
| 2004/0243470 A1 | 12/2004 | Ozer et al. |
| 2004/0254803 A1* | 12/2004 | Myr ................................ 705/1 |
| 2005/0071376 A1 | 3/2005 | Modi |
| 2005/0080702 A1 | 4/2005 | Modi |
| 2005/0108084 A1 | 5/2005 | Ramamoorti et al. |
| 2005/0154656 A1* | 7/2005 | Kim et al. ................... 705/30 |
| 2005/0154657 A1 | 7/2005 | Kim et al. |
| 2005/0187778 A1 | 8/2005 | Mitchell |
| 2005/0240429 A1 | 10/2005 | Dieden et al. |
| 2005/0288942 A1 | 12/2005 | Graboske et al. |
| 2005/0288957 A1* | 12/2005 | Eraker et al. ................. 705/1 |
| 2006/0015357 A1 | 1/2006 | Cagan |
| 2006/0020424 A1 | 1/2006 | Quindel |
| 2006/0080114 A1* | 4/2006 | Bakes et al. .................. 705/1 |
| 2006/0085210 A1 | 4/2006 | Owens |
| 2006/0089842 A1 | 4/2006 | Medawar |
| 2006/0105342 A1 | 5/2006 | Villena et al. |
| 2006/0122918 A1 | 6/2006 | Graboske et al. |
| 2006/0167710 A1* | 7/2006 | King .................... G06Q 30/0601 705/313 |
| 2006/0248555 A1 | 11/2006 | Eldering |
| 2007/0005373 A1 | 1/2007 | Villena et al. |
| 2007/0043770 A1 | 2/2007 | Goodrich et al. |
| 2007/0050342 A1 | 3/2007 | Inkinen et al. |
| 2007/0067180 A1* | 3/2007 | James et al. ................. 705/1 |
| 2007/0106523 A1 | 5/2007 | Eaton et al. |
| 2007/0124235 A1 | 5/2007 | Chakraborty et al. |
| 2007/0132727 A1 | 6/2007 | Garbow et al. |
| 2007/0143132 A1 | 6/2007 | Linne et al. |
| 2007/0143312 A1 | 6/2007 | Wiseman |
| 2007/0150353 A1 | 6/2007 | Krassner |
| 2007/0185727 A1* | 8/2007 | Ma ...................... G06Q 30/0278 705/306 |
| 2007/0244780 A1 | 10/2007 | Liu |
| 2007/0255581 A1* | 11/2007 | Otto et al. ................... 705/1 |
| 2008/0004893 A1 | 1/2008 | Graboske et al. |
| 2008/0015890 A1* | 1/2008 | Malyala ........................ 705/1 |
| 2008/0077458 A1 | 3/2008 | Andersen et al. |
| 2008/0086356 A1 | 4/2008 | Glassman et al. |
| 2008/0109409 A1 | 5/2008 | Hengel |
| 2008/0133319 A1 | 6/2008 | Adiga et al. |
| 2008/0255921 A1 | 10/2008 | Flake et al. |
| 2008/0288335 A1 | 11/2008 | Goldberg |
| 2008/0301064 A1 | 12/2008 | Burns |
| 2009/0006185 A1* | 1/2009 | Stinson ........................ 705/10 |
| 2009/0030707 A1* | 1/2009 | Green ........................... 705/1 |
| 2009/0030864 A1 | 1/2009 | Pednault et al. |
| 2009/0037328 A1 | 2/2009 | Abuar |
| 2009/0043603 A1* | 2/2009 | Rutherford et al. ......... 705/1 |
| 2009/0043637 A1 | 2/2009 | Eder |
| 2009/0048938 A1 | 2/2009 | Dupray |
| 2009/0076902 A1 | 3/2009 | Grinsted et al. |
| 2009/0132316 A1 | 5/2009 | Florance et al. |
| 2009/0144097 A1 | 6/2009 | Fassio et al. |
| 2009/0150216 A1* | 6/2009 | Milman et al. ............... 705/10 |
| 2009/0164464 A1* | 6/2009 | Carrico et al. .............. 707/5 |
| 2009/0210287 A1 | 8/2009 | Chickering et al. |
| 2009/0240586 A1* | 9/2009 | Ramer et al. ............... 705/14 |
| 2009/0265285 A1 | 10/2009 | Balaishis |
| 2010/0005019 A1 | 1/2010 | Yang et al. |
| 2010/0023379 A1 | 1/2010 | Rappaport |
| 2010/0076881 A1 | 3/2010 | O'Grady |
| 2010/0094548 A1 | 4/2010 | Tadman et al. |
| 2010/0114678 A1 | 5/2010 | Axe et al. |
| 2010/0161498 A1 | 6/2010 | Walker |
| 2010/0318451 A1 | 12/2010 | Niccolini |
| 2011/0066510 A1 | 3/2011 | Talegon |
| 2011/0066561 A1* | 3/2011 | Lazarre .................. G06Q 30/00 705/313 |
| 2011/0071899 A1 | 3/2011 | Robertson et al. |
| 2011/0196762 A1 | 8/2011 | DuPont |
| 2011/0218934 A1 | 9/2011 | Elser |
| 2011/0218937 A1 | 9/2011 | Elser |
| 2011/0251967 A1 | 10/2011 | Klivington |
| 2011/0251974 A1 | 10/2011 | Woodward et al. |
| 2011/0270779 A1 | 11/2011 | Showalter |
| 2012/0005111 A2 | 1/2012 | Lowenstein et al. |
| 2012/0011075 A1 | 1/2012 | Graboske et al. |
| 2012/0030092 A1 | 2/2012 | Marshall et al. |
| 2012/0072357 A1 | 3/2012 | Bradford et al. |
| 2012/0078770 A1 | 3/2012 | Hecht |
| 2012/0158459 A1 | 6/2012 | Villena et al. |
| 2012/0191541 A1 | 7/2012 | Yang et al. |
| 2012/0254045 A1 | 10/2012 | Orfano |
| 2012/0311431 A1 | 12/2012 | Breaker et al. |
| 2012/0323798 A1 | 12/2012 | Den Herder et al. |
| 2013/0103459 A1 | 4/2013 | Marshall et al. |
| 2013/0159166 A1 | 6/2013 | Irick |
| 2013/0304654 A1 | 11/2013 | Ma et al. |

(56) References Cited

U.S. PATENT DOCUMENTS

| | | | |
|---|---|---|---|
| 2013/0332877 | A1 | 12/2013 | Florance et al. |
| 2013/0339255 | A1 | 12/2013 | Talbird |
| 2014/0012720 | A1 | 1/2014 | O'Kane |
| 2014/0180936 | A1 | 6/2014 | Ma et al. |
| 2014/0236845 | A1 | 8/2014 | Humphries et al. |
| 2014/0257924 | A1 | 9/2014 | Xie |
| 2014/0279692 | A1 | 9/2014 | Boothby et al. |
| 2014/0316857 | A1 | 10/2014 | Roberts |
| 2014/0316999 | A1 | 10/2014 | Cheng et al. |
| 2014/0372203 | A1 | 12/2014 | Powell et al. |
| 2015/0149275 | A1 | 5/2015 | Bax et al. |
| 2015/0356576 | A1 | 12/2015 | Malaviya et al. |
| 2015/0379588 | A1 | 12/2015 | Ma et al. |

FOREIGN PATENT DOCUMENTS

| | | | |
|---|---|---|---|
| WO | WO-0055771 | A1 | 9/2000 |
| WO | WO-0211038 | A1 | 2/2002 |
| WO | WO-0242980 | A1 | 5/2002 |
| WO | WO-03100692 | A1 | 12/2003 |
| WO | WO-2005015441 | A2 | 2/2005 |
| WO | WO-2006025830 | A1 | 3/2006 |
| WO | WO-2006043951 | A2 | 4/2006 |
| WO | WO-2007051892 | A1 | 5/2007 |

OTHER PUBLICATIONS

"2002 Inman Innovator Award Nominees Announced," PR Newswire, Jul. 16, 2002, 3 pages.
"About Reis, Products & Services," [online], Retrieved from the Internet via the Wayback Machine dated Feb. 5, 2002 on Jun. 13, 2013, URL: http://reis.com/about/aboutproducts_rentcomps.cfm, 2 pages.
"An Introduction to R," <http://web.archive.org/web/20060118050840/http://cran.r-project.org/doc/manuals/R-intro.html>, [internet archive date: Jan. 18, 2006], pp. 1-105.
"Banton Technologies Announces National Home Evaluation Coverage; Company's ValueWizard 3.0 Assesses All Regions of the United States," Business Wire, Jun. 10, 2003, [online] Retrieved from the Internet: URL: http://www.the free library.com/_/print/PrintArticle.aspx?id=102949279, 2 pages.
"Basis100 Partners to Offer Automated Valuation Service," Canada StockWatch, Jan. 27, 2004, 2 pages.
"Basis100 Partners with First American," PR Newswire, Jan. 27, 2004, 3 pages.
"Casa(TM) to Value More Than $100 Billion of Residential Real Estate in 2001—Leading Lenders Saving Big without Compromising Loan Quality," PR Newswire, May 21, 2001, 3 pages.
"Centre for Mathematical Sciences," Lund University, http://web.archive.org/web/20060101005103/http://www.maths.lth.se/, [internet archive date: Jan. 1, 2006], 1 page.
"Directory of Valuation Providers, Your Source for Valuation Information," Zackin Publications Inc., 2004, 5 pages.
"First American Expands Real Estate Valuation Line, Aims to Increase Accuracy with Addition of Veros, Basis100 AVMs," Inman News, Mar. 15, 2004, 2 pages.
"First American Real Estate Solutions Experiences Record," PR Newswire, Nov. 4, 2002, 3 pages.
"First American Real Estate Solutions Releases ValuePoint4," PR Newswire, Oct. 21, 2002, 3 pages.
"First American Real Estate Solutions' ValuePoint(R)4 Experiences Explosive Growth in 2004—Leading Automated Valuation Model (AVM) Usage Grows More Than 700 Percent in 12-Month Period," PR Newswire, Mar. 24, 2005, 3 pages.
"Franchise Offering Circular for Prospective Franchisees," U.S. Appraisal, Nov. 1, 1986, 87 pages.
"GMAC-RFC Selects First American Real Estate Solutions' ValuePoint(R)4 Automated Valuation Model (AVM)," PR Newswire, Jun. 28, 2004, 3 pages.
"HNC Software and RealQuest Team to Provide Widespread Automated Property Valuation; AREAS Users to Have Online Access to Texas MLS," Business Wire, Oct. 1, 1997, 3 pages.
"HomeAdvisor Ranks First in Gomez Poll," Realty Times, Jun. 13, 2001, 3 pages.
"HomeAdvisor Spin-Off Aims to Service Realty Industry," Directions on Microsoft, Apr. 24, 2000, 2 pages.
"HomeSeekers.com and MSN HomeAdvisor Provide Free Web Pages for All Real Estate Agents," PR Newswire, May 20, 1999, 3 pages.
"How do we value your home?," [online] CSWOnline, Retrieved from the Internet via the Wayback Machine dated Oct. 23, 1999, URL: http://w w w .csw online.com/method.shtml, 1 page.
"In Brief: HomeAdvisor Secures $100 Million in Equity Funding," Directions on Microsoft, Aug. 28, 2000, 1 page.
"Microsoft Real Estate Venture Gets Large Investment," The New York Times, Technology section, Aug. 23, 2000, 2 pages.
"MSN HomeAdvisor Becomes Most-Visited Home and Real Estate Web Site, According to Media Metrix," Microsoft News Center, Apr. 13, 2001, Retrieved from the Internet: URL: http://www.microsoft.com/enus/ news/press/2001/Apr01/04-13MarchTrafficPR.aspx?navV3Index=0, 2 pages.
"MSN HomeAdvisor Helps Real Estate Agents and Customers Feel Right at Home on the Internet," Microsoft News Center, Dec. 14, 1998, Retrieved from the Internet: URL: http://www.microsoft.com/enus/ news/features/1998/12-14msn.aspx?navV3Index=0, 2 pages.
"Nation's First Fully Interactive AVM Debuts in Las Vegas AVM News," PRweb press release, AVM News, Feb. 4, 2006, 1 page.
"NetNumina Solutions Creates Robust E-Business Solution for Leader in Real Estate Lending," PR Newswire, Aug. 16, 1999, 3 pages.
"Reis Inc.," Commercial Property News, vol. 18, Issue 6, Mar. 16, 2004, 2 pages.
"Reis, Inc. Launches Apartment Version of Online Valuation and Credit Risk Analysis Module," Business Wire, Nov. 7, 2002, 2 pages.
"RMBS: Guidelines for the Use of Automated Valuation Models for U.K. RMBS Transactions," Standard and Poors.com [online], Sep. 26, 2005 [retrieved Aug. 6, 2013], Retrieved from the Internet, S&P Archive: URL: www.standardandpoors.com/prot/ratings/articles/en/us/?articleType=HTML&assetID=1245330509010, 4 pages.
"Sample CASA Report," [online] CSWOnline, Retrieved from the Internet via the Wayback Machine dated Nov. 6, 1999, URL: http://w w w .csw online.com/sample.shtml, 3 pages.
"Standard on Automated Valuation Models (AVMs)", International Association of Assessing Officers, Approved Sep. 2003, 36 pages.
"The Appraisal" Report, U.S.Appraisal, dated at least by Sep. 29, 1983, 4 pages.
"The Appraiser," Certificate of Copyright Registration, Jun. 25, 1982, 4 pages.
"The Appraiser," Certificate of Copyright Registration, Oct. 19, 1981, 3 pages.
"The Assessor" Demo Video, U.S.Appraisal, [Accessed for review on Jun. 21, 2013, *Zillow Inc.* vs. *Trulia* Case No. 2:12-cv-01549-JLR], [Transcribed Oct. 8, 2013], 10 pages.
"The Assessor" Newsletter, US Appraisal, dated at least by Apr. 10, 1985, 4 pages.
"The Assessor". Source Code, U.S.Appraisal, [Accessed for review on Jun. 21, 2013, *Zillow Inc.* vs. *Trulia* Case No. 2:12-cv-01549-JLR], 2,460 pages.
"The Assessor," Certificate of Copyright Registration, Feb. 2, 1984, 2 pages.
"The Comprehensive R Archive Network,", www.cran.r-project.org, http://web.archive.org/web/20050830073913/cran.r-project.org/banner.shtml, [internet archive date: Aug. 30, 2005], pp. 1-2.
"The R Project for Statistical Computing," www.r-project.org, http://web.archive.org/web/20060102073515/www.r-project.org/main.shtml, [internet archive date: Jan. 2, 2006], 1 page.
"TransUnion Acquires Banton Technologies," PR Newswire, Oct. 20, 2003, 3 pages.
"TransUnion and CSW Form Partnership," Mortgage Banking, vol. 62, Issue 6, Mar. 31, 2002, 1 page.

(56) References Cited

OTHER PUBLICATIONS

"Trulia Estimates," [online], Retrieved from the Internet via the Wayback Machine dated Jan. 16, 2013, URL:http//www.trulia.com/trulia_estimates/, 2 pages.
"Uniform Standards of Professional Appraisal Practice and Advisory Opinions 2005 Edition<" Electronic USPAP 2005 Edition, Appraisal Standards Board, The Appraisal Foundation, Effective Jan. 1, 2005, 10 pages.
"USPAP Q&A," vol. 9, No. 6, The Appraisal Foundation, Jun. 2007, 2 pages.
"What Is an AVM?", Real-Info.com [online], Dec. 22, 2005 [retrieved on Aug. 6, 2013]. Retrieved from the Internet via Internet Archive Wayback Machine: URL: web.archive.org/web/20051222120807/http://www.real-info.com/products_avm.asp?RISID=e8fc23a9a1189fbff9b968e8f86ccde6], 3 pages.
Xactware Unveils Web-Based Valuation Tool for Underwriting, PR Newswire, Dec. 10, 2002, 3 pages.
"Xactware. (Central Utah)," Utah Business, vol. 17, Issue 3, Mar. 1, 2003, 1 page.
Appeal Brief for U.S. Appl. No. 11/524,048, Aug. 9, 2010, 20 pages.
Assignment of Copyright to U.S.Appraisal by Flying Software, Inc., Jan. 2, 1982, 2 pages.
Australian Examiner's First Report in Australian Patent Application 2007216858, dated Dec. 22, 2008, 2 pages.
AVM News, Thomson Media, vol. 1, Issue 1 Jan. 2002, 23 pages.
AVM News, Thomson Media, vol. 1, Issue 10, Oct. 2002, 34 pages.
AVM News, Thomson Media, vol. 1, Issue 11, Nov. 2002, 28 pages.
AVM News, Thomson Media, vol. 1, Issue 12, Dec. 2002, 14 pages.
AVM News, Thomson Media, vol. 1, Issue 2, Feb. 2002, 13 pages.
AVM News, Thomson Media, vol. 1, Issue 3, Mar. 2002, 21 pages.
AVM News, Thomson Media, vol. 1, Issue 4, Apr. 2002, 24 pages.
AVM News, Thomson Media, vol. 1, Issue 5, May 2002, 35 pages.
AVM News, Thomson Media, vol. 1, Issue 6, Jun. 2002, 19 pages.
AVM News, Thomson Media, vol. 1, Issue 7, Jul. 2002, 24 pages.
AVM News, Thomson Media, vol. 1, Issue 8, Aug. 2002, 17 pages.
AVM News, Thomson Media, vol. 1, Issue 9, Sep. 2002, 15 pages.
AVM News, Thomson Media, vol. 10, Issue 1-2, Jan.-Feb. 2011, 72 pages.
AVM News, Thomson Media, vol. 10, Issue 11-12, Nov.-Dec. 2011, 70 pages.
AVM News, Thomson Media, vol. 10, Issue 3-4, Mar.-Apr. 2011, 100 pages.
AVM News, Thomson Media, vol. 10, Issue 5-6, May-Jun. 2011, 106 pages.
AVM News, Thomson Media, vol. 10, Issue 7-8, Jul.-Aug. 2011, 82 pages.
AVM News, Thomson Media, vol. 10, Issue 9-10, Sep.-Oct. 2011, 90 pages.
AVM News, Thomson Media, vol. 11, Issue 1-2, Jan.-Feb. 2012, 66 pages.
AVM News, Thomson Media, vol. 11, Issue 3-4, Mar.-Apr. 2012, 76 pages.
AVM News, Thomson Media, vol. 11, Issue 5-6, May-Jun. 2012, 72 pages.
AVM News, Thomson Media, vol. 2, Issue 1, Jan. 2003, 24 pages.
AVM News, Thomson Media, vol. 2, Issue 10, Oct. 2003, 31 pages.
AVM News, Thomson Media, vol. 2, Issue 11, Nov. 2003, 28 pages.
AVM News, Thomson Media, vol. 2, Issue 12, Dec. 2003, 18 pages.
AVM News, Thomson Media, vol. 2, Issue 2, Feb. 2003, 26 pages.
AVM News, Thomson Media, vol. 2, Issue 3, Mar. 2003, 29 pages.
AVM News, Thomson Media, vol. 2, Issue 4, Apr. 2003, 22 pages.
AVM News, Thomson Media, vol. 2, Issue 5, May 2003, 33 pages.
AVM News, Thomson Media, vol. 2, Issue 6, Jun. 2003, 38 pages.
AVM News, Thomson Media, vol. 2, Issue 7, Jul. 2003, 31 pages.
AVM News, Thomson Media, vol. 2, Issue 8, Aug. 2003, 24 pages.
AVM News, Thomson Media, vol. 2, Issue 9, Sep. 2003, 30 pages.
AVM News, Thomson Media, vol. 3, Issue 1, Jan. 2004, 24 pages.
AVM News, Thomson Media, vol. 3, Issue 10, Oct. 2004, 55 pages.
AVM News, Thomson Media, vol. 3, Issue 11, Nov. 2004, 54 pages.
AVM News, Thomson Media, vol. 3, Issue 12, Dec. 2004, 18 pages.
AVM News, Thomson Media, vol. 3, Issue 2, Feb. 2004, 26 pages.
AVM News, Thomson Media, vol. 3, Issue 3, Mar. 2004, 31 pages.
AVM News, Thomson Media, vol. 3, Issue 4, Apr. 2004, 36 pages.
AVM News, Thomson Media, vol. 3, Issue 5, May 2004, 37 pages.
AVM News, Thomson Media, vol. 3, Issue 6, Jun. 2004, 35 pages.
AVM News, Thomson Media, vol. 3, Issue 7, Jul. 2004, 49 pages.
AVM News, Thomson Media, vol. 3, Issue 8, Aug. 2004, 37 pages.
AVM News, Thomson Media, vol. 3, Issue 9, Sep. 2004, 31 pages.
AVM News, Thomson Media, vol. 4, Issue 1, Jan. 2005, 45 pages.
AVM News, Thomson Media, vol. 4, Issue 10, Oct. 2005, 51 pages.
AVM News, Thomson Media, vol. 4, Issue 11, Nov. 2005, 52 pages.
AVM News, Thomson Media, vol. 4, Issue 12, Dec. 2005, 56 pages.
AVM News, Thomson Media, vol. 4, Issue 2, Feb. 2005, 31 pages.
AVM News, Thomson Media, vol. 4, Issue 3, Mar. 2005, 39 pages.
AVMNews, Thomson Media, vol. 4, Issue 4, Apr. 2005, 40 pages.
AVM News, Thomson Media, vol. 4, Issue 5, May 2005, 51 pages.
AVM News, Thomson Media, vol. 4, Issue 6, Jun. 2005, 34 pages.
AVM News, Thomson Media, vol. 4, Issue 7, Jul. 2005, 53 pages.
AVM News, Thomson Media, vol. 4, Issue 8, Aug. 2005, 30 pages.
AVM News, Thomson Media, vol. 4, Issue 9, Sep. 2005, 48 pages.
AVM News, Thomson Media, vol. 5, Issue 1, Jan. 2006, 58 pages.
AVM News, Thomson Media, vol. 5, Issue 10, Oct. 2006, 85 pages.
AVM News, Thomson Media, vol. 5, Issue 11, Nov. 2006, 86 pages.
AVM News, Thomson Media, vol. 5, Issue 12, Dec. 2006, 54 pages.
AVM News, Thomson Media, vol. 5, Issue 2, Feb. 2006, 53 pages.
AVM News, Thomson Media, vol. 5, Issue 3, Mar. 2006, 41 pages.
AVM News, Thomson Media, vol. 5, Issue 4, Apr. 2006, 54 pages.
AVM News, Thomson Media, vol. 5, Issue 5, May 2006, 48 pages.
AVM News, Thomson Media, vol. 5, Issue 6, Jun. 2006, 62 pages.
AVM News, Thomson Media, vol. 5, Issue 7, Jul. 2006, 74 pages.
AVM News, Thomson Media, vol. 5, Issue 8, Aug. 2006, 57 pages.
AVM News, Thomson Media, vol. 5, Issue 9, Sep. 2006, 63 pages.
AVM News, Thomson Media, vol. 6 Issue 3, Mar. 2007, 49 pages.
AVM News, Thomson Media, vol. 6, Issue 1, Jan. 2007, 42 pages.
AVM News, Thomson Media, vol. 6, Issue 10, Oct. 2007, 52 pages.
AVM News, Thomson Media, vol. 6, Issue 11, Nov. 2007, 23 pages.
AVM News, Thomson Media, vol. 6, Issue 2, Feb. 2007, 47 pages.
AVM News, Thomson Media, vol. 6, Issue 4, Apr. 2007, 59 pages.
AVM News, Thomson Media, vol. 6, Issue 5, May 2007, 66 pages.
AVM News, Thomson Media, vol. 6, Issue 6, Dec. 2007, 38 pages.
AVM News, Thomson Media, vol. 6, Issue 6, Jun. 2007, 46 pages.
AVM News, Thomson Media, vol. 6, Issue 8, Aug. 2007, 35 pages.
AVM News, Thomson Media, vol. 6, Issue 9, Sep. 2007, 37 pages.
AVM News, Thomson Media, vol. 6, Issue7, Jul. 2007, 51 pages.
AVM News, Thomson Media, vol. 7, Issue 07-08, Jul.-Aug. 2008, 56 pages.
AVM News, Thomson Media, vol. 7, Issue 1, Jan. 2008, 44 pages.
AVM News, Thomson Media, vol. 7, Issue 11-12, Nov.-Dec. 2008, 52 pages.
AVM News, Thomson Media, vol. 7, Issue 2, Feb. 2008, 35 pages.
AVM News, Thomson Media, vol. 7, Issue 3, Mar. 2008, 34 pages.
AVM News, Thomson Media, vol. 7, Issue 4, Apr. 2008, 33 pages.
AVM News, Thomson Media, vol. 7, Issue 4-5, May-Jun., 2008, 46 pages.
AVM News, Thomson Media, vol. 7, Issue 9-10, Sep.-Oct. 2008, 68 pages.
AVM News, Thomson Media, vol. 8, Issue 1-2, Jan.-Feb. 2009, 71 pages.
AVM News, Thomson Media, vol. 8, Issue 11-12, Nov.-Dec. 2009, 62 pages.
AVM News, Thomson Media, vol. 8, Issue 3-4, Mar.-Apr. 2009, 45 pages.
AVM News, Thomson Media, vol. 8, Issue 5-6, May-Jun. 2009, 65 pages.
AVM News, Thomson Media, vol. 8, Issue 7-8, Jul.-Aug. 2009, 71 pages.
AVM News, Thomson Media, vol. 8, Issue 9-10, Sep.-Oct. 2009, 53 pages.
AVM News, Thomson Media, vol. 9, Issue 1-2, Jan.-Feb. 2010, 66 pages.
AVM News, Thomson Media, vol. 9, Issue 11-12, Nov.-Dec. 2010, 75 pages.

(56) References Cited

OTHER PUBLICATIONS

AVM News, Thomson Media, vol. 9, Issue 3-4, Mar.-Apr. 2010, 63 pages.
AVM News, Thomson Media, vol. 9, Issue 5-6, May-Jun. 2010, 69 pages.
AVM News, Thomson Media, vol. 9, Issue 7-8, Jul.-Aug. 2010, 63 pages.
AVM News, Thomson Media, vol. 9, Issue 9-10, Sep.-Oct. 2010, 69 pages.
Bailey, Martin J. et al., A Regression Method for Real Estate Price Index Construction, Journal of the American Statistical Association, vol. 58, No. 304 (Dec. 1963), Published by: American Statistical Association, Stable URL: http://www.jstor.org/stable/2283324, pp. 933-942, 11 pages.
Basch, Mark, "Basis100 Sold to California Firm," The Florida Times Union, Jacksonville.com, Jul. 1, 2004, 2 pages.
Bennett, Kristin P. et al.., "Support Vector Machines: Hype or Hallelujah?" SIGKDD Explorations, Dec. 2000, vol. 2, issue 2, ACM SIGKDD, 13 pages.
Borst, Richard A. et al., "An Evaluation of Multiple Regression Analysis, Comparable Sales Analysis and Artificial Neural Networks for the Mass Appraisal of Residential Properties in Northern Ireland," 1996, 16 pages.
Borst, Richard A. et al., "Use of GIS to Establish and Update CAMA Neighborhoods in Northern Ireland," Available prior to Sep. 1997, 9 pages.
Borst, Richard A., "A Valuation and Value Updating of Geographically Diverse Commercial Properties Using Artificial Neural Networks," 1993, 2 pages.
Borst, Richard A., "Computer Assisted Mass Appraisal, A New Growth Industry in the United States," Accessed from International Association of Assessing Officers Research and Technical Services Department, Document 00994, Dated no later than Jun. 8, 1979, 28 pages.
Borst, Richard A., "The Common Thread in Market Data Systems," World Congress on Computer-Assisted Valuation, Aug. 1-6, 1982, 14 pages.
Boston Housing Data, http://www.ics.uci.edu/~mlearn/databases/housing/housing.names, [accessed Dec. 13, 2005], 1 page.
Breiman et al., "Random Forest," Classification Description, http://www.stat.berkeley.edu/users/breiman/RandomForests/cc_home.htm, [accessed Dec. 13, 2005], pp. 1-28.
Breiman, L., "Random Forests," Machine Learning, 45, 2001, Kluwer Academic Publishers, The Netherlands, pp. 5-32.
Breiman, Leo et al., Random Forests, R Mathematical Software Package, licensed by Salford Systems, available at URL cran.r-project.org, and described at "Package 'randomForest'", version 4.6-7, Feb. 15, 2013, Published Oct. 16, 2012, available at URL cran.r-project.org/web/packages/randomforest/randomForest.pdf., 29 pages.
Calhoun, Charles A., "Property Valuation Methods and Data in the United States," Housing Finance International Journal 16.2, Dec. 2001, pp. 12-23.
Casa Property Valuation screen capture, dated at least by Jan. 24, 2005, 1 page.
Case, Karl E., et al., "Prices of Single Family Homes Since 1970: New Indexes for Four Cities," Cowles Foundation for Research in Economics at Yale University, New Haven, Connecticut, Discussion Paper No. 851, Oct. 1987, 54 pages.
CDR Business Solutions, LLC, What is RELAR, <http://www.relar.com/relarsystem.aspx> Aug. 24, 2011, Archived by Internet Wayback Machine <http://web.archive.org/web/2011 0824084613/http://www.relar.com/relarsystem.aspx> viewed Aug. 20, 2015, pp. 1-4.
Centre for Mathematical Sciences, Lund University, "Classification and Regression with Random Forest," http://web.archive.org/web/20060205051957/http://www.maths.lth.se/help/R/.R/library/randomForest/html/randomForest.html, [internet archive date: Feb. 5, 2006], pp. 1-4.
Complaint for Patent Infringement, Demand for Jury Trial for U.S. Pat. No. 7,970,674, Case 2:12-cv-01549-JLR, Sep. 12, 2012, 8 pages.
Cozzi, Guy, Real Estate Appraising from A to Z, 4th Edition, Nemmar Real Estate Training, Jan. 1, 2002, 226 pages, Parts 1-2.
Crowston, Kevin, et al., "Real Estate War in Cyberspace: An Emerging Electronic Market?," Syracuse University Surface, School of Information Studies (iSchool), Jan. 1, 1999, 14 pages.
Curriculum Vitae of Steven R. Kursh, Ph.D., CSDP, CLP, Aug. 2013, 9 pages.
Cypress Software Introduces AVM Module for Mark IV Application; Module Provides Instant Home Appraisal for Loans Processed by the Loan-Decisioning Platform, Business Wire, Nov. 15, 2005, 2 pages.
Decision—Institution of Covered Business Method Patent Review for U.S. Pat. No. 7,970,674, Case CBM2013-00056, Entered Mar. 10, 2014, 36 pages.
Decision—Institution of Inter Partes Review for U.S. Pat. No. 7,970,674, Case No. IPR2013-00034, Apr. 2, 2013, 28 pages.
Decision on Appeal for U.S. Appl. No. 11/524,048, dated Oct. 19, 2012, 7 pages.
Decision on Request for Rehearing for U.S. Pat. No. 7,970,674, Case No. IPR2013-00034, Apr. 22, 2013, 5 pages.
Declaration Brooke A.M. Taylor in Support of Plaintiff Vasudevan Software, Inc.'s Motion for Sanctions Against Microstrategy, Case No. 3:11-06637-RS-PSG, Nov. 20, 2012, 3 pages.
Declaration of Dr. Richard Borst, Aug. 26, 2013, 43 pages.
Declaration of John Kilpatrick, Case No. IPR2013-00034, Jun. 14, 2013, 23 pages.
Declaration of Jordan Connors in Support of Plaintiff Vasudevan Software, Inc.'s Motion for Sanctions Against Microstraqtegy, Case No. 3:11-06637-RS-PSG, Nov. 20, 2012, 4 pages.
Declaration of Leslie V. Payne in Support of Plaintiff Vasudevan Software, Inc.'s Motion for Sanctions Against Microstrategy, Case No. 3:11-06637-RS-PSG, Nov. 20, 2012, 3 pages.
Declaration of Steven R. Kursh, Ph.D., CSDP, CLP, CBM 2013-00056, Filed Sep. 11, 2013, 108 pages.
Declaration of Steven R. Kursh, Ph.D., CSDP, CLP, CBM2014-00115, Filed Apr. 10, 2014, 108 pages.
Defendant Trulia, Inc.'s Answer to Complaint for Patent Infringement and Counterclaim, Demand for Jury Trial, Case No. 2:12-cv-01549-JLR, Mar. 1, 2013, 10 pages.
Defendant Trulia, Inc.'s Non-Infringement and Invalidity Contentions, Case No. 2:12-cv-01549-JLR, Jun. 21, 2013, 24 pages.
Defendant Trulia, Inc.'s Non-Infringement and Invalidity Contentions, Exhibit A, Case No. 2:12-cv-01549-JLR, Jun. 21, 2013, 267 pages.
Dempster, A.P. et al., "Maximum Likelihood from Incomplete Data via the Algorithm," Journal of the Royal Statistical Society, 1977, Series B 39 (1): 1-38, JSTOR 2984875, MR 0501537, [online], Retrieved from the Internet: URL: http://www.jstor.org/stable/2984875?origin=JSTOR-pdf, 38 pages.
Department of the Treasury, Internal Revenue Service, "How to Depreciate Property," Publication 946, made available at www.irs.gov by dated at least 2004 112 pages.
Deposition Transcription of John A. Kilpatrick, Ph.D., Aug. 8, 2013, 263 pages.
European Examination Report, Application No. 07018380.1, dated May 16, 2013, 6 pages.
European Examination Report, Application No. 07018380.1, dated Oct. 24, 2008, 6 pages.
European Examination Report, Application No. 07018380.1, dated Nov. 8, 2012, 6 pages.
Evaluation Services, Inc. Warranty to Lender's Service, Inc., dated at least by Feb. 12, 1997, 144 pages.
Evans, Blanche, "Microsoft HomeAdvisor: Software Giant, Real Estate Portal," Realty Times, Mar. 30, 2000, 3 pages.
Evans, Blanche, The Hottest E-careers in Real Estate, Dearborn Financial Publishing Inc., 2000, 241 pages.
Examiner's Answer for U.S. Appl. No. 11/524,048, dated Oct. 28, 2010, 13 pages.

(56) References Cited

OTHER PUBLICATIONS

Fannie Mae Form 2055, Federal National Mortgage Association [online], Mar. 2005, Retrieved from the Internet: URL: https://www.fanniemae.com/content/guide_form/2055.pdf, 8 pages.
Fannie Mae Form 2075, Desktop Underwriter Property Inspection Report, Federal National Mortgage Association [online], not dated, Retrieved from the Internet: URL: https://www.fanniemae.com/content/guide_form/2075.pdf, 3 pages.
Feldman, David et al., "Mortgage Default: Classification Trees Analysis," The Pinhas Sapir Center for Development Tel-Aviv University, Discussion Paper No. 3—2003, Oct. 2003, 46 pages.
FHFA, "Distress-Free House Price Indexes." https://www.fhfa.gov/DataTools/Downloads/Documents/HPI_Focus_Pieces/2012Q2_HPI_N508.pdf. Jul. 13, 2014.
File History of U.S. Pat. No. 7,970,674, Dated Feb. 3, 2006-Apr. 2, 2013, 404 pages, Parts 1-4.
Final Office Action for U.S. Appl. No. 11/347,000, dated Jan. 3, 2012, 17 pages.
Final Office Action for U.S. Appl. No. 11/347,024, dated Feb. 3, 2011, 28 pages.
Final Office Action for U.S. Appl. No. 11/524,047, dated Jul. 23, 2010, 7 pages.
Final Office Action for U.S. Appl. No. 11/524,047, dated Sep. 28, 2012, 8 pages.
Final Office Action for U.S. Appl. No. 11/524,047, dated Jun. 12, 2015, 31 pages.
Final Office Action for U.S. Appl. No. 11/524,048, dated Dec. 8, 2009, 11 pages.
Final Office Action for U.S. Appl. No. 13/044,480, dated Feb. 19, 2014, 31 pages.
Final Office Action for U.S. Appl. No. 13/044,480, dated Jul. 10, 2015, 35 pages.
Final Office Action for U.S. Appl. No. 13/044,490, dated Mar. 14, 2013, 35 pages.
Final Office Action for U.S. Appl. No. 13/044,490, dated May 7, 2015, 36 pages.
Final Office Action for U.S. Appl. No. 13/417,804, dated Aug. 13, 2014, 14 pages.
Final Office Action for U.S. Appl. No. 13/943,604, dated Mar. 6, 2015, 28 pages.
Final Office Action for U.S. Appl. No. 14/167,962, dated Sep. 30, 2015, 13 pages.
Final Office Action for U.S. Appl. No. 14/191,388, dated Dec. 15, 2014, 12 pages.
Final Office Action for U.S. Appl. No. 14/318,536, dated Dec. 11, 2014, 47 pages.
Final Office Action for U.S. Appl. No. 11/927,623, dated Sep. 19, 2011, 13 pages.
Final Office Action for U.S. Appl. No. 13/417,804, dated Oct. 14, 2015, 11 pages.
Final Office Action for U.S. Appl. No. 13/828,680, dated Jul. 26, 2016, 59 pages.
Final Office Action for U.S. Appl. No. 13/843,577, dated Mar. 22, 2016, 63 pages.
Final Office Action for U.S. Appl. No. 14/078,076, dated Feb. 26, 2016, 21 pages.
Final Written Decision for U.S. Pat. No. 7,970,674, Case IPR2013-00034, Entered Mar. 27, 2014, 44 pages.
Finkelstein, Brad, "PlatinumData Improving Value of Its Information," Origination News and SourceMedia, Inc., vol. 15, Section: Special Report, Section:2, Nov. 1, 2005, 2 pages.
First American Real Estate Solutions Releases ValuePoint4, AVM News, Thomson Media, vol. 1, Issue 10, Oct. 2002, pp. 28-29.
Fletcher, June, "High-Tech Is Coming for High-End House Sales," Wall Street Journal, Sep. 19, 1997, 1 page.
Fletcher, June, "On the Web: What's Your House Worth?," Wall Street Journal, Sep. 26, 1997, 1 page.
Fletcher, June, "Touring the Tangled Web of For-Sale-by-Owner Homes," The Wall Street Journal, Jun. 6, 1997, 1 page.

Freddie Mac Form 70, Uniform Residential Appraisal Report, Federal Home Loan Mortgage Corporation [online], Mar. 2005, Retrieved from the Internet: URL: https://www.fanniemae.com/content/guide_form/1004.pdf, 8 pages.
Freddie Mac's Home Value Explorer screen capture, dated at least by Jul. 15, 2003, 1 page.
Google, Google Trends, retrieved from the internet Oct. 12, 2015 <http://www.google.com/trends> (website address only—No document).
Great Britain Examination Report in Application No. GB0701944.1, dated May 5, 2010, 3 pages.
Great Britain Search Report for GB0701944.1, dated Mar. 23, 2007, 3 pages.
Hill, T. and Lewicki, P., "K-Nearest Neighbors," Statistics Methods and Applications, 2007, http://www.statsoft.com/textbook/stknn.html, [internet accessed on [Dec. 6, 2007], 5 pages.
Hochgraf, Lisa, "Tools for Top Speed," Credit Union Management, vol. 26, Issue 8, Aug. 1, 2003, 4 pages.
HomeSearch Report, [online], Retrieved from the Internet via the Wayback Machine dated Dec. 10, 2005 on Jun. 19, 2013, URL: http://homesmartreports.com/samples/samplehomesearch.htm, 3 pages.
HomeSmart About, [online], Retrieved from the Internet via the Wayback Machine dated Dec. 10, 2005 http://homesmartreports.com/hs_about.htm, 2 pages.
HomeSmart Reports, [online], Retrieved from the Internet via the Wayback Machine dated Dec. 10, 2005 on Jun. 19, 2013, URL: http://homesmartreports.com/default.aspx, 1 page.
HomeSmart Sellers, [online], Retrieved from the Internet via the Wayback Machine dated Dec. 10, 2005 on Jun. 19, 2013, URL: http://homesmartreports.com/hs_owners.htm, 1 page.
HomeSmart Terms of Use, [online], Retrieved from the Internet via the Wayback Machine dated Dec. 10, 2005 on Jun. 19, 2013, URL: http://homesmartreports.com/hs_disclaimer.htm, 3 pages.
HomeSmartReports, [online], Retrieved from the Internet via the Wayback Machine dated Oct. 13, 2005 on Jun. 19, 2013, URL: http://homesmartreports.com/, 2 pages.
Indeed, Job Trends: Podcast, retrieved from the internet Oct. 12, 2015 <http://www.indeed.com/jobtrends> (website only—No document).
Infinite Regression, Certificate of Copyright Registration Filing, Apr. 2, 1984, 3 pages.
Inman, "Zilpy, the new 'Z' site in online real estate", published Feb. 7, 2008, retrieved from http://www.inman.com/2008/02/07/zilpy-new-z-site-in-online-real-estate/ on Aug. 11, 2016, 2 pages.
Jensen, David L., "Alternative Modeling Techniques in Computer-Assisted Mass Appraisal," Property Tax Journal, vol. 6, No. 3, Sep. 1987, pp. 193-237.
Jobster, Job Search Trends for Keywords and Locations, retrieved from the internet Oct. 12, 2015 <http://www.jobster.com/find/US/jon/search/trends> (website only—No document).
John Battelle's Searchblog,: The Database of Intentions, Nov. 13, 2003.
Kilpatrick, John A., "The Future of Real Estate Information," Real Estate Issues, Spring 2001, 8 pages.
Kilpatrick, John A., et al., "House Price Impacts of School District Choice," South Carolina Center for Applied Real Estate Education and Research, Dec. 28, 1998, 25 pages.
Krasilovsky, Peter, "Chris Terrill Discusses ServiceMagic's Rebranding to 'Home Advisor,'" Home Advisor, Oct. 17, 2012, 5 pages.
Lankarge, Vicki, et al., How to Increase the Value of Your Home: Simple, Budget-Conscious Techniques and Ideas That Will Make Your Home Worth Up to $100,000 More!, McGraw-Hill, 2004, 176 pages.
Leonhardt, David, The Internet Knows What You'll Do Next, Jul. 5, 2006, http://www.nytimes.com/2006/07/05/business/05leonhardt.html?ex=1309752000&en=8be0be92819a6f8f&ei=5088&partner=rssnyt&emc=rss.
McCluskey, William J. et al., "An Evaluation of MRA, Comparable Sales Analysis, and ANNs for the Mass Appraisal of Residential Properties in Northern Ireland," Assessment Journal, Jan./Feb. 1997, 8 pages.
McGarity, M., "The Values Debate," Mortgage Banking, vol. 65, Issue 6, Mar. 1, 2005, 14 pages.

(56) References Cited

OTHER PUBLICATIONS

McWilliams, Charlyne H., "The Tale of AVMs," Mortgage Banking, vol. 64, Issue 5, Feb. 1, 2004, 7 pages.
Melville, J., "How much should I charge to rent my house?", published Dec. 5, 2010, retrieved from http://homeguides.sfgate.com/much-should-charge-rent-house-8314.html on Aug. 11, 2016, 2 pages.
Meyer, Robert T., "The Learning of Multiattribute Judgment Policies," The Journal of Consumer Research, vol. 14, No. 2, Sep. 1987, 20 pages.
Microstrategy Inc.'s Opposition to Plaintiff Vasudevan Software, Inc.'s Motion for Sanctions, Case No. 11-CV-06637-RS-PSG, Jan. 4, 2013, 23 pages.
Miller et al., A Note on Leading Indicators of Housing Market Price Trends, vol. 1, No. 1, 1986.
Miller et al., Multiple Regression Condominium Valuation with a Touch of Behavioral Theory, The Appraisal Journal 1987.
Miller et al., Pricing Strategies and Residential Property Selling Prices, The Journal of Real Estate Research, vol. 2, No. 1, Nov. 1, 1987.
Miller et al., The Impact of Interest Rates and Employment on Nominal Housing Prices, International Real Estate Review, vol. 8 No. 1, pp. 26-42, 2005.
Mobasher B. "Classification Via Decision Trees in WEKA," DePaul University, Computer Science, Telecommunications, and Information Systems, ECT 584—Web Data Mining, 2005, http://maya.cs.depaul.edu/~classes/Ect584/WEKA/classify.html, [internet accessed on Dec. 6, 2007], 5 pages.
Morton, T. Gregory, Regression Analysis Appraisal Models: Selected Topics and Issues, Center for Real Estate and Urban Economic Studies, University of Connecticut, Real Estate Report: No. 19, Oct. 1976, 85 pages.
Motion for Pro Hac Vice Admission and Exhibit A for U.S. Pat. No. 7,970,674, Case No. IPR2013-00034, Filing Date Dec. 17, 2012, 13 pages.
MRMLS Realist Tax System Foreclosure User Guide, crmls.org/help/realist_manuals/realist_foreclosure.pdf. Oct. 30, 2007.
MSN House & Home—More Useful Everyday screen capture, [online], Retrieved from the Internet via the Wayback Machine dated Mar. 23, 2003 on Jun. 19, 2013, URL: http://web.archive.org/web/20030323183505/http://houseandhome.msn.com/, 2 pages.
Mullaney, Timothy J., "A new Home Site on the Block," Bloomberg Businessweek [online], Feb. 7, 2006, Retrieved from the Internet: URL: http://www.businessweek.com/stories/2006-02-07/a-new-home-site-on-the-block, 3 pages.
Munarriz, Rick A., "Pop Goes the Bubble," The Motley Fool, Fool.com [online] Feb. 14, 2006, Retrieved from the Internet; URL: http://www.fool.com/investing/small-cap/2006/02/14/pop-goes-the-bubble.aspx, 4 pages.
Non-Final Office Action for U.S. Appl. No. 11/524,047, dated May 7, 2012, 7 pages.
Non-Final Office Action for U.S. Appl. No. 11/524,047, dated Nov. 4, 2013, 8 pages.
Non-Final Office Action for U.S. Appl. No. 13/044,480, dated Oct. 24, 2013, 29 pages.
Non-Final Office Action for U.S. Appl. No. 11/347,000, dated Oct. 27, 2010, 23 pages.
Non-Final Office Action for U.S. Appl. No. 11/347,000, dated Nov. 23, 2012, 6 pages.
Non-Final Office Action for U.S. Appl. No. 11/347,000, dated Apr. 9, 2010, 18 pages.
Non-Final Office Action for U.S. Appl. No. 11/347,000, dated May 27, 2011, 13 pages.
Non-Final Office Action for U.S. Appl. No. 11/347,024, dated Dec. 10, 2009, 45 pages.
Non-Final Office Action for U.S. Appl. No. 11/347,024, dated May 13, 2010, 33 pages.
Non-Final Office Action for U.S. Appl. No. 11/524,047, dated Dec. 1, 2014, 26 pages.
Non-Final Office Action for U.S. Appl. No. 11/524,047, dated Oct. 28, 2009, 8 pages.
Non-Final Office Action for U.S. Appl. No. 11/524,047, dated Jul. 8, 2011, 7 pages.
Non-Final Office Action for U.S. Appl. No. 11/524,048, dated Apr. 29, 2009, 10 pages.
Non-Final Office Action for U.S. Appl. No. 11/927,623, dated Jan. 11, 2016, 13 pages.
Non-Final Office Action for U.S. Appl. No. 11/927,623, dated Dec. 28, 2010, 10 pages.
Non-Final Office Action for U.S. Appl. No. 11/971,758, dated Feb. 2, 2011, 22 pages.
Non-Final Office Action for U.S. Appl. No. 13/044,480, dated Jul. 17, 2014, 31 pages.
Non-Final Office Action for U.S. Appl. No. 13/044,480, dated Mar. 12, 2015, 32 pages.
Non-Final Office Action for U.S. Appl. No. 13/044,490, dated Jan. 14, 2016, 18 pages.
Non-Final Office Action for U.S. Appl. No. 13/044,490, dated Dec. 17, 2014, 30 pages.
Non-Final Office Action for U.S. Appl. No. 13/044,490, dated Oct. 11, 2012, 30 pages.
Non-Final Office Action for U.S. Appl. No. 13/417,804, dated Jan. 28, 2015, 12 pages.
Non-Final Office Action for U.S. Appl. No. 13/417,804, dated Feb. 26, 2014, 13 pages.
Non-Final Office Action for U.S. Appl. No. 13/828,680, dated Dec. 15, 2015, 42 pages.
Non-Final Office Action for U.S. Appl. No. 13/843,577, dated Sep. 24, 2015, 50 pages.
Non-Final Office Action for U.S. Appl. No. 13/943,604, dated Nov. 19, 2014, 24 pages.
Non-Final Office Action for U.S. Appl. No. 14/167,962, dated Mar. 3, 2015, 26 pages.
Non-Final Office Action for U.S. Appl. No. 14/167,962, dated Oct. 31, 2014, 23 pages.
Non-Final Office Action for U.S. Appl. No. 14/191,388, dated Aug. 7, 2014, 5 pages.
Non-Final Office Action for U.S. Appl. No. 14/318,536, dated Aug. 8, 2014, 38 pages.
Non-Final Office Action for U.S. Appl. No. 13/044,480, dated Aug. 17, 2016, 40 pages.
Non-Final Office Action for U.S. Appl. No. 13/044,490, dated Jul. 22, 2016, 11 pages.
Non-Final Office Action for U.S. Appl. No. 14/041,450, dated Aug. 18, 2016, 48 pages.
Non-Final Office Action for U.S. Appl. No. 14/078,076, dated Aug. 14, 2015, 15 pages.
Notice of Allowability and Examiner-Initiated Interview Summary for U.S. Appl. No. 11/524,048, dated Jul. 3, 2013, 11 pages.
Notice of Allowance for U.S. Appl. No. 11/347,024, dated Apr. 18, 2011, 7 pages.
Notice of Allowance for U.S. Appl. No. 11/524,048, dated Feb. 25, 2013, 14 pages.
Notice of Allowance for U.S. Appl. No. 11/971,758, dated Nov. 10, 2011, 12 pages.
Notice of Allowance for U.S. Appl. No. 11/347,000, dated Oct. 24, 2013, 12 pages.
Notice of Allowance for U.S. Appl. No. 11/524,048, dated Jul. 18, 2013, 10 pages.
Notice of Allowance for U.S. Appl. No. 13/417,804, dated Aug. 18, 2016, 15 pages.
Notice of Allowance for U.S. Appl. No. 14/191,388, dated Jun. 25, 2014, 9 pages.
Notice of Appeal for U.S. Pat. No. 7,970,674, Case IPR2013-00034, May 1, 2014, 5 pages.
O'Brien, Jeffrey M., "What's Your House Really Worth?," Fortune [online], Feb. 15, 2007, Retrieved from the Internet: URL: http://money.cnn.com/magazines/fortune/fortune_archive/2007/02/19/8400262/index.htm, 6 pages.

(56) References Cited

OTHER PUBLICATIONS

Oldham, Jennifer, "Pricing's Tangled Web, Consumers Using the Internet to Calculate Home Values Find that the Results—and Data They're Based on—Vary," Los Angeles Times, Jul. 30, 2000, 5 pages.
One-month Office Action for U.S. Appl. No. 11/347,000, dated Jul. 26, 2013, 6 pages.
Oral Hearing Petitioner Demonstratives, U.S. Pat. No. 7,970,674, Case IPR2013-00034, Email Date Nov. 14, 2013, 85 pages.
Oral Hearing Transcript for U.S. Pat. No. 7,970,674, Case IPR2013-00034, Held Nov. 21, 2013, Entered Feb. 20, 2014, 96 pages.
Order Authorizing Motion for Pro Hac Vice Admission for U.S. Pat. No. 7,970,674, Case No. IPR2013-00034, Filing Date Jan. 3, 2013, 4 pages.
Pagourtzi, E. et al., "Real Estate Appraisal: A Review of Valuation Methods," Journal of Property Investment & Finance, vol. 21, No. 4, 2003, pp. 383-401.
Palmquist, Raymond B., "Alternative Techniques for Developing Real Estate Price Indexes," The Review of Economics and Statistics, vol. 62, No. 3 (Aug. 1980), pp. 442-448.
PASS screen capture, dated at least by Oct. 20, 2004, 1 page.
Patent Owner's Demonstrative Exhibit for Oral Hearing, U.S. Pat. No. 7,970,674, Case IPR2013-00034, Exhibit 2023, Email Date Nov. 21, 2013, 56 pages.
Patent Owner's Observations on Cross Examination of Dr. Richard A. Borst, Ph.D., U.S. Pat. No. 7,970,674, Case IPR2013-00034, Oct. 10, 2013, 9 pages.
Patent Owner's Response to Revised Petition for Inter Partes Review for U.S. Pat. No. 7,970,674, Case No. IPR2013-00034, dated Jun. 14, 2013, 41 pages.
Patent Owner's Response to the Petition for Covered Business Method Patent Review for U.S. Pat. No. 7,970,674, Case No. CBM2013-00056, dated Jun. 20, 2014, 72 pages.
Petition for Covered Business Method Patent Review for U.S. Pat. No. 7,970,674, CBM2013-00056, Sep. 11, 2013, 87 pages.
Petition for Covered Business Method Patent Review for U.S. Pat. No. 7,970,674, CBM2014-00115, Apr. 10, 2014, 69 pages.
Petition for Inter Partes Review for U.S. Pat. No. 7,970,674, Case No. IPR2013-00034, dated Oct. 26, 2012, 65 pages.
Petitioner Response to Patent Owner's Observations on Cross Examination of Dr. Richard A. Borst, Ph.D., U.S. Appl. No. 7,970,674, Case IPR2013-00034, Oct. 24, 2013, 7 pages.
Petitioner's Reply to Patent Owner Response to Petition, U.S. Pat. No. 7,970,674, Case No. IPR2013-00034, Aug. 26, 2013, 20 pages.
Plaintiff Vasudevan Software, Inc.'s Notice of Motion and Motion for Sanctions Against Microstrategy, Case No. 3:11-06637-RS-PSG, Dec. 12, 2012, 23 pages.
Plaintiff Vasudevan Software, Inc.'s Reply in Support of Motion for Sanctions Against Microstrategy, Case No. 3:11-06637-RS-PSG, Jan. 24, 2013, 25 pages.
Potharst, R. et al., "Classification Trees for Problems with Monotonicity Constraints," ACM SIGKDD Explorations Newsletter 4.1, 2002, pp. 1-10.
Potharst, R. et al., "Classification Trees for Problems with Monotonicity Constraints," ERIM Report Series Research in Management, Erasmus Research Institute of Management, Apr. 2002, 39 pages.
PowerBase 6.0 screen capture, dated at least by Oct. 20, 2004, 1 page.
Prasad, Nalini et al., "Measuring Housing Price Growth—Using Stratification to Improve Median-based Measures", Reserve Bank of Australia, 2006, p. 1.
Preliminary Patent Owner Response and Exhibits for U.S. Pat. No. 7,970,674, Case No. IPR2013-00034, Feb. 15, 2013, 228 pages.
Preliminary Patent Owner Response for U.S. Pat. No. 7,970,674, Case No. CBM2013-00056, Dec. 18, 2013, 85 pages.
Preliminary Patent Owner Response for U.S. Pat. No. 7,970,674, Case No. IPR2013-00034, Feb. 15, 2013, 39 pages.
Quinlan, Ross J., "C4.5: Programs for Machine Learning," Machine Learning, 1993, Morgan Kaufmann Publishers, San Francisco, CA, USA., 302 pages. Book to be mailed to USPTO.

Quirk, B., "Zilpy.com launches a rental data website built in partnership with Zillow!!!", published Jan. 29, 2008, retrieved from http://www.propertymanagementmavens.com/archives/2008/1 on Aug. 11, 2016, 3 pages.
Real Info Inc., RELAR Sample Report, <http://www.real-info.com/products_RELAR.asp> Aug. 18, 2010, Archived by Internet Wayback Machine <http://web.archive.org/web/20100818012252/http://www.real-info.com/products_RELAR.asp> viewed Aug. 24, 2015, pp. 1-4.
Real-info.com, "What is an AVM," www.real-info.com/products_avm.asp? Internet Archive Date: Oct. 30, 2005, [accessed Mar. 21, 2007], 5 pages.
RealEstateABC.com, see paragraph headed "How do I make the estimate more accurate?" www.realestateabc.com/home-values/ <http://www.realestateabc.com/home-values/>, Internet Archive Dated: Apr. 5, 2006, [accessed Mar. 20, 2007], 4 pages.
RealQuest.com screen capture, dated at least by Dec. 12, 2002, 1 page.
RealQuest.com screen capture, dated at least by Oct. 20, 2004, 1 page.
RealQuest.com ValuePoint R4 Report screen capture, dated at least by Sep. 30, 2002, 1 page.
RealQuest.com Vector screen capture, dated at least by Oct. 20, 2004, 1 page.
Redfin, https://web.archive.org/web/20060907212454/http :/ /www.redfin.com/stingray/do/terms-ofuse?rt=fn-tl, Wayback Machine Sep. 7, 2006.
Reis SE 2.0 User Guide Book, Reis, 2004, 40 pages.
Reis SE 2.0 User Guide Book, Reis, 2005, 37 pages.
Reis Valuation and Credit Risk Analysis Module Overview, [online], Sep. 18, 2003, Retrieved from the Internet via the Wayback Machine dated Sep. 19, 2003 on Jun. 17, 2013, URL: http://www.reiscom/valuation/valuationOverview.cfm, 2 pages.
Replacement Demonstrative Exhibit for Oral Hearing, U.S. Pat. No. 7,970,674, Case IPR2013-00034, File Date Nov. 21, 2013, 83 pages.
Replacement Patent Owner's Demonstrative Exhibit for Oral Hearing, U.S. Pat. No. 7,970,674, Case IPR2013-00034, File Date Nov. 21, 2013, 36 pages.
Reply Brief for U.S. Appl. No. 11/524,048, Dec. 22, 2010, 6 pages.
Request for Rehearing for U.S. Pat. No. 7,970,674, Case No. IPR2013-00034, Apr. 16, 2013, 8 pages.
Requirement Under Rule 105 for U.S. Appl. No. 11/927,623, dated Jul. 2, 2014, 4 pages.
Response to Decision on Appeal for U.S. Appl. No. 11/524,048, Dec. 19, 2012, 7 pages.
Response to Final Office Action for U.S. Appl. No. 11/347,024, dated Mar. 4, 2011, 17 pages.
Revised Petition for Inter Partes Review for U.S. Pat. No. 7,970,674, Case No. IPR2013-00034, dated Nov. 13, 2012, 55 pages.
Rossini, Peter, "Using Expert Systems and Artificial Intelligence for Real Estate Forecasting," Sixth Annual Pacific-Rim Real Estate Society Conference, Sydney, Australia, Jan. 24-27, 2000, 10 pages.
Rye, Owen E., "A Multiple Criteria Analysis Model for Real Estate Evaluation," Journal of Global Optimization 12.2, Mar. 1998, pp. 197-214.
Rye, Owen E., "Automated Property Assessment," Transactions of the American Association of Cost Engineers, Nov. 2004, pp. 28-32.
Sample Appraisal Report of a Single-Family Residence, U.S. Appraisal, Sep. 15, 1982, 16 pages.
Sample HomeSmart Value Report, [online], Retrieved from the Internet via the Wayback Machine dated Dec. 10, 2005 on Jun. 19, 2013, URL: http://homesmartreports.com/samples/samplevaluation.htm, 4 pages.
Sample Residential Appraisal Report, U.S.Appraisal, Jul. 16, 1982, 2 pages.
Second Office Action in Chinese Patent Application No. 200710306194.8, dated Apr. 1, 2010, 9 pages, english translation.
Simons, R. A., "Chapter 6: Valuation of Impaired Property," When Bad Things Happen to Good Property, Throupe, R. et al., Environmental Law Institute, May 2006, 30 pages.
Software Referral Agreement with Sole Source Provision between Sperry Corporation and U.S.Appraisal, May 1985, 47 pages.

(56) References Cited

OTHER PUBLICATIONS

Standard & Poors, "Guidelines for the use of Automated Valuation Models for U.K. RMBS Transactions," http://www.rics.org/NR/rdonlyres/8Fcdd20c-7FAC-4549-86FB-3930CD0CBC05/0/StandardandPoorsReportonAVMs.pdf, Published Feb. 20, 2004, 4 pages.
StatSoft, Inc., "Classification Trees," http://www.statsoft.com/textbook/stclatre.html, ã1984-2003 [accessed Dec. 13, 2005], pp. 1-20.
Svetnik et al., "Random Forest: A Classification and Regression Tool for Compound Classification and QSAR Modeling", J Chem Info. Computer Science, vol. 43, 2003, pp. 1947-1958.
System Operations Manual for "The Research Assistant", Evaluation Services, Inc., Feb. 12, 1997, 92 pages.
System Operations Manual, "The Research Assistant", Database Valuation Version, Evaluation Services, Inc., Feb. 12, 1997, 35 pages.
Tay et al., "Artificial Intelligence and the Mass Appraisal of Residential Apartments," Journal of Property Valuation and Investment, Feb. 1, 1992, 17 pages.
The Assessor, A Computerized Assessment System, NCR Corporation, 1986, 6 pages.
The MicroAppraisal, Certificate of Copyright Registration, Feb. 2, 1984, 2 pages.
Transcript of Deposition of R. A. Borst, Ph. D., Case IPR2013-00034 (JL), Transcribed Sep. 19, 2013, 177 pages.
Transcript of Proceedings in Case No. C 11-06637 RS, Jan. 24, 2013, 24 pages.
U.S. Appraisal Business Plan, dated at least since Aug. 1, 1985, 30 pages.
U.S. Appraisal Offering Memorandum, Sep. 12, 1984, 66 pages.
US. Appraisal Profit and Loss Proforma, dated at least since Aug. 1, 1985, 38 pages.
Valuation Reports, Schedule A, U.S. Appraisal, dated at least by Nov. 1, 1986, 6 pages.
Valuations, Claims Cross Engines, Inman News Features, Dec. 10, 2002, 1 page.
ValuePoint4 Report; File No. 04040103629, Apr. 12, 2004, 3 pages.
Vapnik et al., "Support-Vector Networks," Machine Learning, vol. 20, 1995, 25 pages.
VeroValue screen capture, dated at least by Sep. 30, 2004, 1 page.
Visual PAMSPro 2000, [online], Retrieved from the Internet via the Wayback Machine dated Mar. 4, 2001 on Jun. 19, 2013, URL: http://www.visualpamspro.com/prod01.htm, 2 pages.
Visual PAMSPro Custom Add Ins, [online], Retrieved from the Internet via the Wayback Machine dated Mar. 5, 2001 on Jun. 19, 2013, URL: http://www.visualpamspro.com/serv04.htm, 2 pages.
Visual PAMSPro Downloads, [online], Retrieved from the Internet via the Wayback Machine dated Mar. 2, 2001 on Jun. 19, 2013, URL: http://www.visualpamspro.com/download.htm, 1 page.
Visual PAMSPro Home, [online], Retrieved from the Internet via the Wayback Machine dated Mar. 2, 2001 on Jun. 19, 2013, URL: http://www.visualpamspro.com/, 1 page.
Visual PAMSPro News, [online], Retrieved from the Internet via the Wayback Machine dated Mar. 2, 2001 on Jun. 19, 2013, URL: http://www.visualpamspro.com/news.htm, 2 pages.
Visual PAMSPro Products, [online], Retrieved from the Internet via the Wayback Machine dated Mar. 2, 2001 on Jun. 19, 2013, URL: http://www.visualpamspro.com/products.htm, 1 page.
Visual PAMSPro Real Estate Appraisal Software, Appraisal Software Real Estate, [online], Retrieved from the Internet via the Wayback Machine dated Sep. 2, 2001 on Jun. 19, 2013, URL: http://www.visualpamspro.com/prodvpp2.htm, 6 pages.
Visual PAMSPro Tips and Tricks, [online], Retrieved from the Internet via the Wayback Machine dated Mar. 2, 2001 on Jun. 19, 2013, URL: http://www.visualpamspro.com/Tips- Tricks.htm, 1 page.
Wikipedia, Expectation-maximization Algorithm, [online] Retrieved from the Internet via the Wayback Machine dated Dec. 21, 2013 on Feb. 28, 2014, URL: http://en.wikipedia.org/wiki/Expectation%E2%80%93maximization_algorithm, 13 pages.
Wikipedia, Survival Analysis, <http://en.wikipedia.org/wiki/Survival_analysis> Oct. 16, 2011, Archived by Internet Wayback Machine <http://web.archive.org/web/20111016061152/http:/!en.wikipedia.org/wiki/Survival_analysis>, viewed Aug. 28, 2015, pp. 1-5.
Zillow.com, Quarterly Report 2Q 2006, A Review of the San Francisco Real Estate Market.
Final Office Action for U.S. Appl. No. 11/927,623, dated Nov. 3, 2016, 15 pages.
Non-Final Office Action for U.S. Appl. No. 13/830,497, dated Sep. 14, 2016, 52 pages.
Non-Final Office Action for U.S. Appl. No. 14/078,076, dated Oct. 19, 2016, 29 pages.
Final Office Action for U.S. Appl. No. 13/044,490, dated Mar. 29, 2017, 7 pages.
Non-Final Office Action for U.S. Appl. No. 13/843,577, dated Dec. 19, 2016, 80 pages.
U.S. Appl. No. 15/220,518 for VanderMey et al., filed Jul. 27, 2016.
U.S. Appl. No. 15/456,235 for VanderMey et al., filed Mar. 10, 2017.
U.S. Appl. No. 11/927,623 of Humphries et al., filed Oct. 29, 2007.
U.S. Appl. No. 13/044,480 of Humphries et al., filed Mar. 9, 2011.
U.S. Appl. No. 13/044,490 of Humphries et al., filed Mar. 9, 2011.
U.S. Appl. No. 13/828,680 of Humphries et al., filed Mar. 14, 2013.
U.S. Appl. No. 13/830,497 of Humphries et al., filed Mar. 14, 2013.
U.S. Appl. No. 14/041,450 of Humphries et al., filed Sep. 30, 2013.
U.S. Appl. No. 14/078,076 of Daimler et al., filed Nov. 12, 2013.
U.S. Appl. No. 14/325,094 of Bruce et al., filed Jul. 7, 2014.
U.S. Appl. No. 14/524,148 of Humphries et al., filed Oct. 27, 2014.
U.S. Appl. No. 14/640,860 of Rao et al., filed Mar. 6, 2015.
U.S. Appl. No. 14/704,567 of Wang et al., filed May 5, 2015.
U.S. Appl. No. 14/709,719 of Humphries et al., filed May 12, 2015.
U.S. Appl. No. 14/721,437 of Humphries et al., filed May 26, 2015.
U.S. Appl. No. 15/439,388 of Bruce et al., filed Feb. 22, 2017.
U.S. Appl. No. 15/698,276 of Humphries et al., filed Sep. 7, 2017.
U.S. Appl. No. 15/715,098 of Moghimi, filed Sep. 25, 2017.
U.S. Appl. No. 15/789,617 of VanderMey, filed Oct. 20, 2017.
Beracha, E., et al., "The Rent versus Buy Decision: Investigating the Needed Property Appreciation Rates to be Indifferent between Renting and Buying Property." Journal of Real Estate Practice and Education, 15(2), 71-88.
Final Office Action for U.S. Appl. No. 14/078,076, dated Jul. 27, 2017, 32 pages.
Final Office Action for U.S. Appl. No. 14/167,962, dated Nov. 9, 2017, 23 pages.
Final Office Action for U.S. Appl. No. 13/044,480, dated Jun. 12, 2017, 55 pages.
Final Office Action for U.S. Appl. No. 13/830,497, dated Jun. 8, 2017, 57 pages.
Final Office Action for U.S. Appl. No. 13/843,577, dated Oct. 6, 2017, 83 pages.
Final Office Action for U.S. Appl. No. 14/041,450, dated Apr. 6, 2017, 47 pages.
Non-Final Office Action for U.S. Appl. No. 14/041,450, dated Nov. 16, 2017, 11 pages.
Non-Final Office Action for U.S. Appl. No. 14/704,567, dated Dec. 7, 2017, 19 pages.
Non-Final Office Action for U.S. Appl. No. 13/044,490, dated Jan. 24, 2018, 8 pages.
Non-Final Office Action for U.S. Appl. No. 13/828,680, dated Nov. 16, 2017, 47 pages.
Non-Final Office Action for U.S. Appl. No. 14/325,094, dated Oct. 31, 2017, 69 pages.
Non-Final Office Action for U.S. Appl. No. 14/524,148, dated Dec. 15, 2017, 27 pages.
Non-Final Office Action for U.S. Appl. No. 14/721,437, dated Dec. 18, 2017, 53 pages.
Non-Final Office Action for U.S. Appl. No. 14/846,632, dated Jan. 16, 2018, 9 pages.
Non-Final Office Action for U.S. Appl. No. 11/927,623, dated Oct. 6, 2017, 15 pages.
Non-Final Office Action for U.S. Appl. No. 14/167,962, dated Apr. 6, 2017, 22 pages.

(56) References Cited

OTHER PUBLICATIONS

Non-Final Office Action for U.S. Appl. No. 14/709,719, dated Jan. 31, 2018, 11 pages.
Archer, W.R. et al., "Measuring the Importance of Location in House Price Appreciation", J. of Urban Economics, vol. 40, 1996, pp. 334-353, accessible at https://www.sciencedirect.com/science/article/pii/S0094119096900364 (accessed Feb. 26, 2018). (Year: 1996).
Campbell, "Forced Sales and House Prices", 101 American Economic Review 2108, pp. 2108-2131, Aug. 2011.
Clauretie, "Estimating the House Foreclosure Discount Corrected for Spatial Price Interdependence and Endogeneity of Marketing Time", 37 Real Estate Economics 43, pp. 44-48, 2009.
Final Office Action for U.S. Appl. No. 14/041,450, dated Jun. 29, 2018, 14 pages.
Final Office Action for U.S. Appl. No. 14/704,567, dated May 1, 2018, 24 pages.
Final Office Action for U.S. Appl. No. 14/325,094, dated Jun. 5, 2018, 81 pages.
Final Office Action for U.S. Appl. No. 14/524,148, dated Jul. 19, 2018, 54 pages.
Final Office Action for U.S. Appl. No. 13/828,680, dated Jul. 11, 2018, 59 pages.
Final Office Action for U.S. Appl. No. 14/846,632, dated Jun. 11, 2018, 16 pages.
Gelfand, A.E. et al., "The Dynamics of Location in Home Price," J. of Real Estate Fin. and Econ., vol. 29:2 2004, pp. 149-166, accessible at https://link.springer.com/content/pdf/10.1023%2FB%3AREAL.0000035308.15346.0a.pdf (accessed Feb. 26, 2018). (Year: 2004).
Humphries, S., "Foreclosure Liquidations Abate in the Fourth Quarter but At the Expense of Number of Homes Underwater," Zillow Research, Feb. 8, 2011, 3 pages.
Non-Final Office Action for U.S. Appl. No. 13/044,480, dated May 2, 2018, 51 pages.
Non-Final Office Action for U.S. Appl. No. 11/927,623, dated Mar. 26, 2018, 15 pages.
Non-Final Office Action for U.S. Appl. No. 14/640,860, dated Mar. 7, 2018, 141 pages.
Non-Final Office Action for U.S. Appl. No. 13/830,497, dated Apr. 12, 2018, 48 pages.
Notice of Allowance for U.S. Appl. No. 13/044,490, dated May 22, 2018, 8 pages.
Notice of Allowance for U.S. Appl. No. 14/167,962, dated Apr. 9, 2018, 11 pages.
Notice of Allowance for U.S. Appl. No. 14/167,962, dated May 14, 2018, 8 pages.
Quercia, R.G. et al., "Spatio-Temporal Measurement of House Price Appreciation in Underserved Areas," J. of Housing Research, vol. 11, 2000, available at https://pdfs.semanticscholar.org/3a44/ddfbc508f61f8952d7e440c37cfdfaf441 ba.pdf (accessed Feb. 26, 2018). (Year: 2000).
Roth, JD, "Is it Better to Rent or to Buy?" Time Business, Dec. 3, 2012, 2 pages.
U.S. Appl. No. 15/996,787 of VanderMey, filed Jun. 4, 2018.
Final Office Action for U.S. Appl. No. 13/044,480, dated Dec. 14, 2018, 35 pages.
Non-Final Office Action for U.S. Appl. No. 14/041,450, dated Jan. 8, 2019, 23 pages.
Non-Final Office Action for U.S. Appl. No. 14/325,094, dated Dec. 18, 2018, 95 pages.
Non-Final Office Action for U.S. Appl. No. 14/846,632, dated Dec. 26, 2018, 13 pages.
Notice of Allowance for U.S. Appl. No. 13/044,490, dated Dec. 5, 2018, 6 pages.
U.S. Appl. No. 16/235,009 for Humphries, filed Dec. 28, 2018.
Final Office Action for U.S. Appl. No. 14/721,437, dated Nov. 9, 2018, 84 pages.
Final Office Action for U.S. Appl. No. 14/709,719, dated Aug. 3, 2018, 27 pages.
Final Office Action for U.S. Appl. No. 14/640,860, dated Oct. 23, 2018, 85 pages.
Non-Final Office Action for U.S. Appl. No. 13/843,577, dated Aug. 30, 2018, 63 pages.
Readyratios.com, "Cost Approach to Value," https://www.readyratios.com/reference/appraisal/cost_approach_to_value.html, archived on Jul. 16, 2013, https://web.archive.org/web/20130716153950/https:www.readyratios.com/reference/appraisal/cost_approach_to_value.html, viewed Oct. 30, 2018, p. 1.
U.S. Appl. No. 16/125,318 for Humphries, filed Sep. 7, 2018.
U.S. Appl. No. 16/129,282 for Humphries, filed Sep. 12, 2018.
Final Office Action for U.S. Appl. No. 14/325,094, dated Jun. 7, 2019, 58 pages.
Final Office Action for U.S. Appl. No. 11/927,623, dated Jun. 14, 2019, 18 pages.
Non-Final Office Action for U.S. Appl. No. 14/704,567, dated Apr. 1, 2019, 29 pages.
Non-Final Office Action for U.S. Appl. No. 14/709,719, dated Jun. 3, 2019, 29 pages.

\* cited by examiner

500

| FOR SALE | RESALE | $1,998,000 | 3785 16TH ST, SAN FRANCISCO, CA 94114 |

| HOME FACTS | PHOTOS (9) | MAP & NEARBY | COMPARABLES | SALES TRENDS | HOME VALUE | MORTGAGE |

<< BACK TO HOME VALUE

ORIGINAL VALUE $1,845,000

THIS ESTIMATOR IS DESIGNED TO HELP YOU SEE HOW CERTAIN CHANGES/IMPROVEMENTS WILL AFFECT THE HOME VALUE. THOSE WILL NOT BE SAVED NOR PUBLICLY DISPLAYED.

502

ADJUST HOME FACTS

UPDATE ANY MISSING OR INCORRECT PUBLIC FACTS ABOUT THIS PROPERTY. CERTAIN CHANGES MIGHT NOT AFFECT THE OVERALL HOME VALUE.

RESIDENCE
[ SINGLE-FAMILY HOME ▼ ]

| BEDROOMS | BATHROOMS | TOTAL ROOMS |
| 2 | 2 | 3 |

| # STORIES | YEAR BUILT | HOME SIZE | LOT SIZE |
| 3 | 1982 | 1,956 SQFT | 876 SQFT |

TOTAL CHANGES:                         -$5,000

SCROLLS DOWN THE PAGE AND UPDATES DYNAMICALLY TO MATCH TOTALS ON THE RIGHT

REFINE THE VALUE BY ADDING HOME IMPROVEMENTS

HERE YOU CAN ADD ANY MISSING HOME IMPROVEMENTS OR REMODELLING THAT WERE DONE TO THIS PROPERTY. NOTE THAT THE VALUE OF THOSE MIGHT NOT BE ALWAYS EQUAL TO THE COST DUE TO DEPRECIATION (WEAR AND TEAR WITH TIME).

ADD A HOME IMPROVEMENT           TOTAL COST
[                          ▼]     [ $           ]

DATE COMPLETED
[         ▼] [         ▼]         [ ADD ]

☑ BATHROOM ADDITION (UPSCALE)
    COMPLETED IN APR 2009 | COST: $12,000          VALUE: $10,750

☑ MAJOR KITCHEN REMODELLING (MID-RANGE)
    COMPLETED IN JAN 2010 | COST: $20,000          VALUE: $17,250

EXAMPLE CONTINUED IN FIG. 5B

FIG. 5A

EXAMPLE CONTINUED FROM FIG. 5A

500

| TOTAL CHANGES: | | | | +$28,000 |
|---|---|---|---|---|

| ORIGINAL VALUE | $1,845,000 |
|---|---|
| HOME FACTS | -$5,000 |
| IMPROVEMENTS | +$28,000 |
| COMPARABLES | +$62,000 |
| ADJUSTED VALUE | |
| | $1,930,000 |

504

CHOOSE COMPARABLE HOMES       SHOW MAP

| | ADDRESS | Bd/Ba | SIZE | PRICE | LAST SALE |
|---|---|---|---|---|---|
| ☑ | 39 MARIETTA DR<br>0.25 MI | 3/2 | 1,620 SQFT | $1,790,000 | $1,450,000<br>10/12/2009 |
| ☑ | 3501 FILLMORE ST<br>0.28 MI | 3/2 | 1,590 SQFT | $1,860,000 | $1,100,000<br>07/15/2008 |
| ☑ | 39 MARIETTA DR<br>0.25 MI | 3/2 | 1,590 SQFT | $1,790,000 | $1,450,000<br>10/12/2009 |
| ☑ | 9520 SOUTH VAN NESS...<br>0.34 MI | 3/2 | 1,590 SQFT | $1,860,000 | $1,100,000<br>07/15/2008 |
| ☑ | 39 MARIETTA DR<br>0.79 MI | 3/2 | 1,500 SQFT | $1,790,000 | - |
| ☐ | 9520 SOUTH VAN NESS...<br>1.25 MI | 3/2 | 1,490 SQFT | $1,860,000 | $1,100,000<br>07/15/2008 |
| ☐ | 39 MARIETTA DR<br>1.13 MI | 3/2 | 1,420 SQFT | $1,790,000 | $1,450,000<br>10/12/2009 |
| ☐ | 9520 SOUTH VAN NESS...<br>0.25 MI | 3/2 | 1,390 SQFT | $1,860,000 | - |
| ☐ | 39 MARIETTA DR<br>2.48 MI | 3/2 | 1,320 SQFT | $1,790,000 | $1,450,000<br>10/12/2009 |
| ☐ | 9520 SOUTH VAN NESS...<br>0.25 MI | 3/2 | 1,300 SQFT | $1,860,000 | $1,100,000<br>07/15/2008 |

<PREVIOUS I 1 2 3 I NEXT>

| TOTAL CHANGES: | +$62,000 |
|---|---|

FIG. 5B

VALUATION SYSTEM

BACKGROUND OF THE INVENTION

Real estate information has become widely available on real estate and other websites on the Internet. For example, a user may obtain information about properties for sale, neighborhoods, interest rates, recently sold homes, etc. Users (e.g., buyers and sellers of properties) of real estate websites are often interested in whether or when to buy or sell real estate property. Oftentimes the user is interested in learning about the value of the property. However, typical estimation techniques are based on a limited set of data and do not account for other factors that may significantly affect the valuation. In addition, the various factors that are used to come up with an estimate are typically opaque to the user. As such, improved techniques for estimating a valuation of a real estate property would be useful.

BRIEF DESCRIPTION OF THE DRAWINGS

Various embodiments of the invention are disclosed in the following detailed description and the accompanying drawings.

FIGS. 5A-B show a diagram illustrating an embodiment of an interface for adjusting an estimated property valuation.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
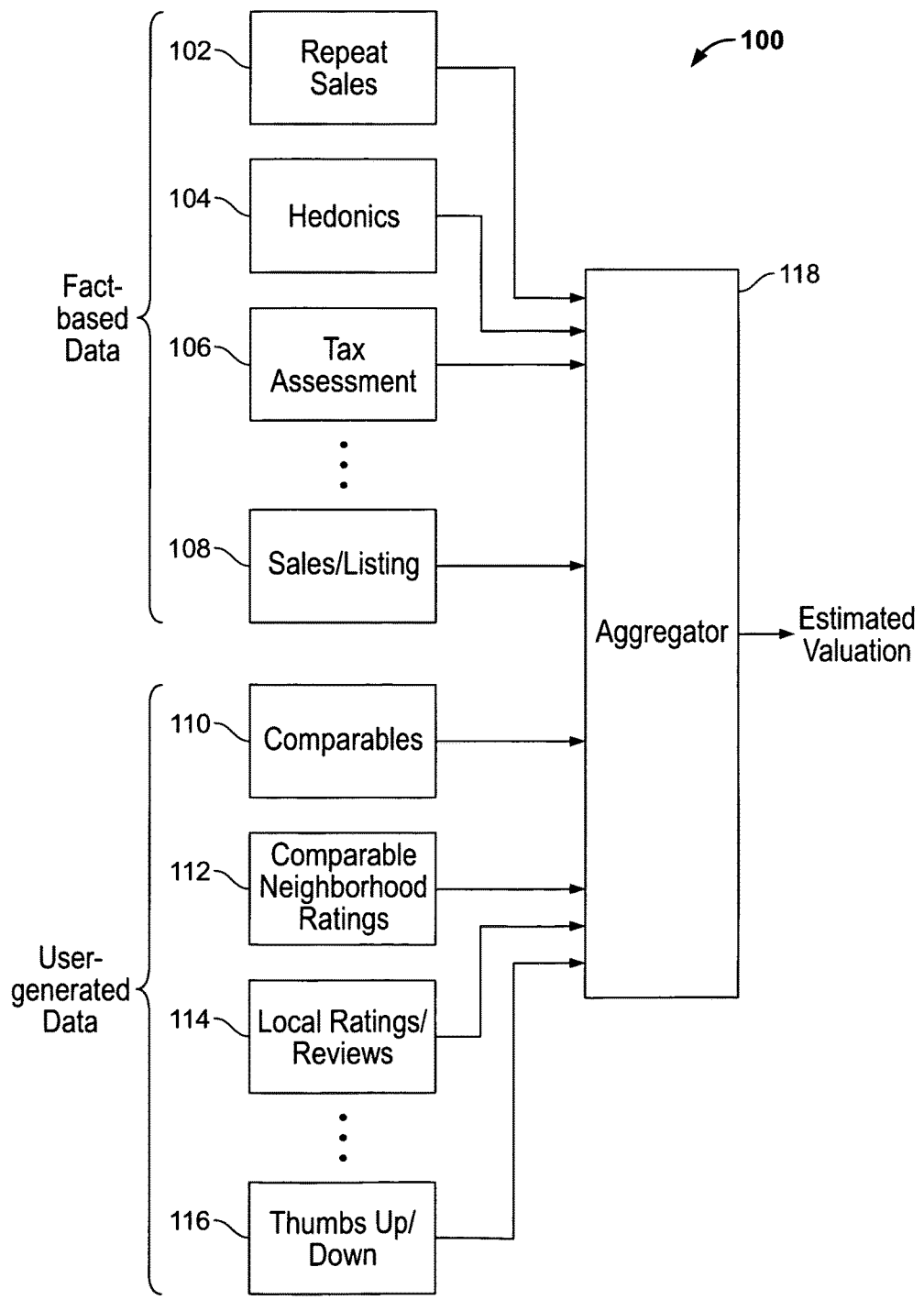
FIG. 1 is a block diagram illustrating an embodiment of an evaluation system for estimating a valuation of a target property.

FIG. 1 is a block diagram illustrating an embodiment of an evaluation system for estimating a valuation of a target property. In this example, the target property is a real estate property of interest. However, in other embodiments, the target property may be any item for which an estimated valuation is desired, such as an automobile, a share of stock, etc.

In some embodiments, evaluation system 100 is part of a real estate website that provides real estate information to users. For example, users may be able to search for real estate properties, view information about properties, and request an estimated valuation of a property. In some embodiments, system 100 is used to provide the estimated valuation of a property. In some embodiments, system 100 processes and outputs the estimated valuation in response to a request from to view a page that displays the estimated valuation. In some embodiments, system 100 batch processes and stores estimated valuations for a plurality of properties and retrieves the estimated valuations as needed.

In this example, evaluation system 100 is shown to include a number of data inputs and corresponding data models, including: repeat sales 102, hedonics 104, tax assessment 106, sales/listing 108, comparables 110, comparable neighborhood ratings 112, local ratings/reviews 114, and thumbs up/down 116.

As used herein, user-generated or subjective data comprises data that is subjective to user(s), and is obtained based on user activity and/or user input. In some embodiments, the user activity and/or user input is associated with users of a real estate website that is configured to monitor at least a portion of user activity and receive input from users, such as ratings and reviews. In this example, user-generated data includes: comparables data, comparable neighborhood ratings data, local ratings/reviews data, and thumbs up/down data. Such data is fed into corresponding data models 110-116. User-generated data can include passively-provided or actively-provided user-generated data. Passively-provided user data is based on, for example, monitoring user activity or traffic (e.g., comparables data). Actively provided user data is based on, for example, data that the user explicitly types in or otherwise provides (e.g., ratings/reviews, thumbs up/down).

As used herein, fact-based data comprises objective data, e.g., data other than that based on user activity and/or user input. In this example, fact-based data includes repeat sales data, hedonics data, tax assessment data, and, sale/listing ratio data. Such data is fed into corresponding data models 102-108.

Data models 102-116 are configured to output statistical data (e.g., a mean and variance) associated with an estimated valuation of the target property. In some embodiments, data models 102-116 are independent ensemble data models. Aggregator 118 is configured to combine the various statistical outputs of each of the data models into a final estimated valuation. Aggregator 118 may used any appropriate technique in various embodiments. In some embodiments, aggregator 118 uses a perceptron—such as a neural net or other dynamic model. Weighted averages of the input models are created by the perceptron and could be obtained by training the perceptron using known input and output data. The weights would reflect how reliable each of the data models is in predicting the estimated value. In various embodiments, aggregator 118 may take a weighted average of the data model outputs, pick the data model output associated with the smallest standard deviation, average the data model outputs, randomly pick one data model output, etc. In some embodiments, the final estimated valuation is based at least in part on each of the various fact-based data and user-generated data. In other embodiments the final estimated valuation is based on only user-generated data or a user-selected subset of the fact-based data and/or user-generated data, as will be more fully described below. In some embodiments, the user can weight the different types of data inputs, for example, using slider bars.

Repeat sales data is provided as input to data model 102 and comprises pairs of sales for the same property (or state, county, or zip code) over time. Repeat sales data can be used to compare the price of a single house (or a single neighborhood) against itself at different points in time.

Hedonic data is provided as input to data model 104 and includes constituent parts that each contribute to the estimated valuation. Examples of hedonic data includes number of bedrooms, number of bathrooms, overall rooms, number of stories, square footage, lot size, whether the property has a fireplace, pool, etc. A hedonic data model could assign a value to each of these parts based on the neighborhood in which the property is located and/or other factors.

Tax assessment data is provided as input to data model 106 and comprises what the property was last assessed at for tax purposes, typically by the county in which the property is located. Some counties skew the value high or low. A tax assessment data model could account for this and also determine the present value of the assessment based on the year of the last tax assessment.

Sales/listing ratio data is provided as input to data model 108 and comprises the ratio of an actual sales price to a listing sales price. Listing prices tend to be higher than actual sales prices, for example. A sales/listing ratio data model could adjust a list price to a more realistic sales price, for example.

These are only some examples of fact-based data. In other embodiments, other types of fact-based data and associated fact-based data models may be used.

Comparables data is provided as input to data model 110 and includes data that is used to determine comparable properties to the target property. In some embodiments, comparables data may be determined based on criteria specified by the user. For example, a list of criteria may be provided, and the user may checkmark the criteria the user would like used to determine comparables. In some embodiments, comparables data includes user activity (e.g., user traffic, user click patterns, and browsing habits/history). For example, user traffic (e.g., the amount of traffic a web page associated with a property receives) can be used to determine the popularity of a property. User traffic can be used with time on the market of a property to determine the popularity of the property. User click patterns (e.g., which pages a user clicks to view), can be used to indicate which properties are viewed by the same users. An example of how a comparables data model uses click patterns is more fully described below.

In some embodiments, adjusted comparables data is also used as input to data model 110. In some embodiments, adjusted comparables data includes the price difference between the property being evaluated and the medium or median valuation of comparable homes.

Figure 8:
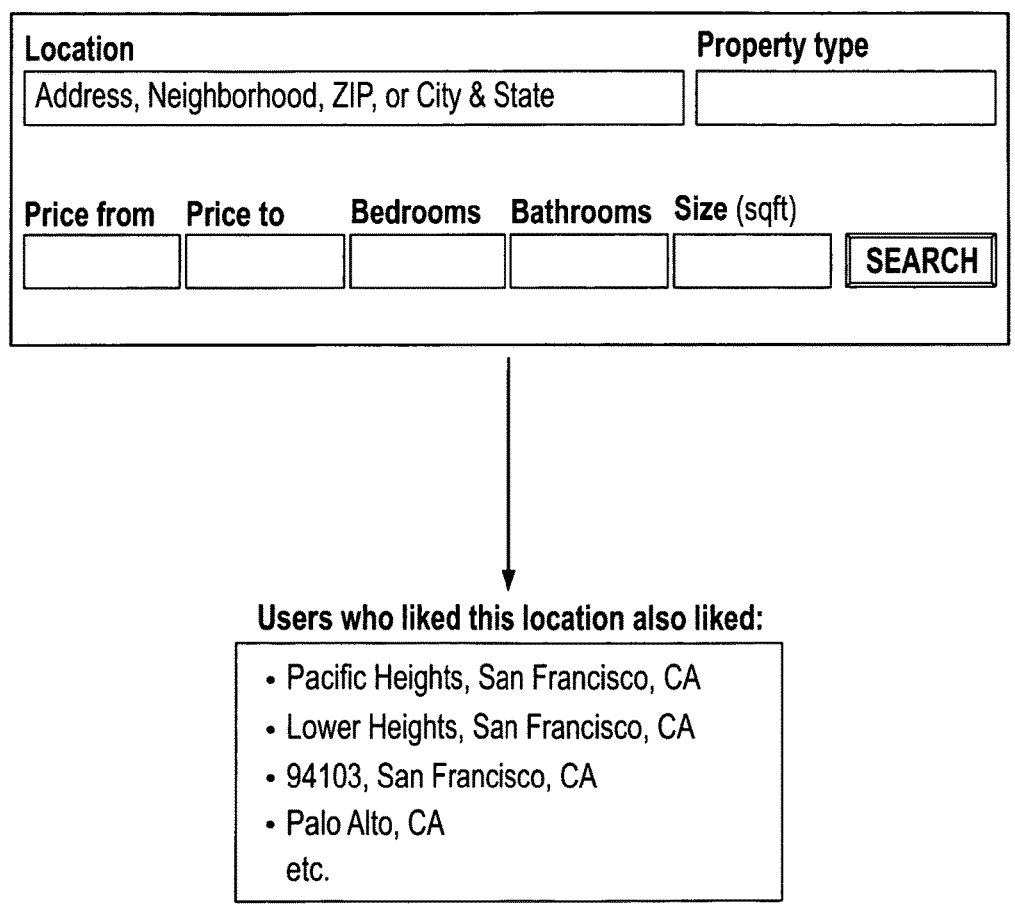
FIG. 8 is a diagram illustrating an example of an interface for indicating comparable neighborhoods.

Comparable neighborhood ratings data is provided as input to data model 112 and includes data that is used to determine comparable neighborhoods to the neighborhood in which the property is located. As used herein, a neighborhood may comprise any geographical region, such as a polygon, a zip code, a city, a county, a state, etc. A neighborhood may be defined by a data provider, such as Maponics (www.maponics.com). Comparable neighborhood ratings data can be used to factor in the neighborhood into a property's estimated valuation. In some embodiments, comparable neighborhood ratings data includes user activity data. For example, user traffic (e.g., the amount of traffic web pages associated with properties in a neighborhood receives) can be used to determine the popularity of a neighborhood. User click patterns can be used to indicate which neighborhoods are viewed by the same users. In some embodiments, similar techniques to determine comparable properties can be used to determine comparable neighborhoods. FIG. 8 is a diagram illustrating an example of an interface for indicating comparable neighborhoods. In this example, locations that are determined to be comparable to a location of interest are listed and suggested. In this example, a location could be any appropriate location, such as an address, neighborhood, zip code, city, or state. In this example, locations are determined to be comparable based on user activity data, such as user click patterns. For example, the locations suggested may be other locations that users who have viewed the location of interest have also viewed most frequently.

Local ratings/reviews data is provided as input to data model 114 and is used to get a subjective opinion from users looking or living in the neighborhood. In some embodiments, ratings and/or reviews are collected for a set of categories, such as school quality, traffic, air quality, safety, crimes, walkability, restaurants and shopping, recreation, entertainment and nightlife, public transportation, community, cleanliness, etc. For example, users could provide a rating between 1-5 for each of these categories. A data model could use this data to determine an estimated value, giving greater weight to users who live in the neighborhood, for example.

Thumbs up/down is provided as input to data model 116 and is used by users to agree or disagree with data, such as a list price (or an estimated value). For example, a user might select "thumbs down" if a list price seems unreasonably high based on that user's knowledge. A data model could weight a professional (e.g., realtor, appraiser, etc.)'s opinion more than that of a consumer. In some embodiments, thumbs up/down can be used to agree/disagree with the estimated value, in which case, such data can be fed back into aggregator 118 to adjust the estimated valuation.

These are only some examples of user-generated data. In other embodiments other types of user-generated data and associated data models may be used.

In some embodiments, a data model might take as input both fact-based data and user-generated data. For example, a comparables data model might use both user click patterns and facts (e.g., square footage and number of bedrooms) to determine comparable properties.

Figure 2:
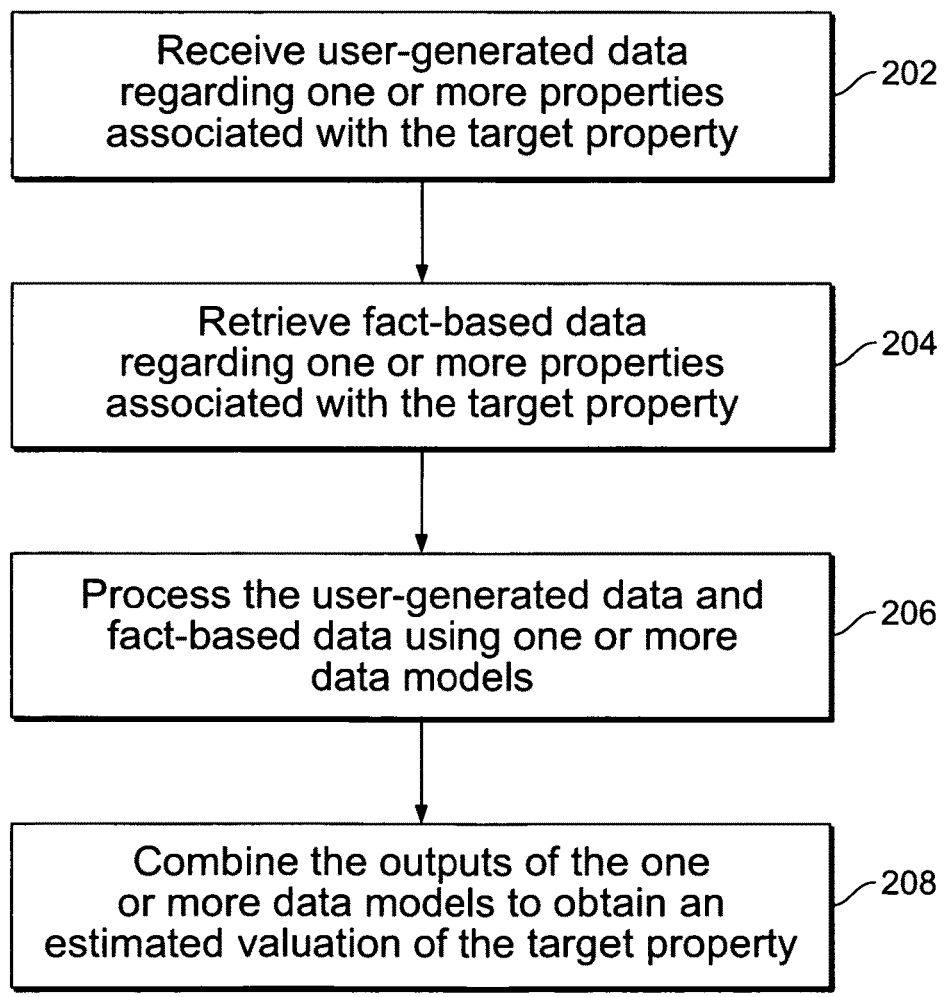
FIG. 2 is a flow chart illustrating an embodiment of a process for estimating a valuation of a target property.

FIG. 2 is a flow chart illustrating an embodiment of a process for estimating a valuation of a target property. In some embodiments, this process is performed by evaluation system 100.

In the example shown, at 202, user-generated data regarding one or more properties associated with the target property is received. For example, in system 100, comparables, comparable neighborhood ratings, local ratings/reviews, and thumbs up/down data are received.

At 204, fact-based data regarding one or more properties associated with the target property is retrieved. For example, such information could be retrieved from one or more external databases. For example, in system 100, repeat sales, hedonics, tax assessment, and sales/listing ratio data is retrieved.

The one or more properties at 202 and/or 204 could include, for example, the target property and comparable properties to the target properties. Comparable properties may be defined in various ways in various embodiments. For example, comparable properties could include other properties in a given vicinity of and/or in the same neighborhood as the target property. Comparable properties could be identified based at least in part on user-generated data, such as described above.

At 206, the user-generated data and fact-based data are processed using one or more data models that are configured to process the data. For example, in system 100, comparables, comparable neighborhood ratings, local ratings/reviews, and thumbs up/down data is processed by data models 110-116, each of which is configured to process one of these types of data. In other embodiments, a data model may be configured to process more than one type of data. In some embodiments, at least one of the data models is provided by a user. For example, a user may obtain or write a custom data model (e.g., a plug-in).

At 208, the outputs of the one or more data models are combined to obtain an estimated valuation of the target property. For example, in system 100, the outputs of data models 110-116 are combined by aggregator 118 to obtain an estimated valuation. As previously described, aggregator 118 may use any appropriate technique for combining, such as a perceptron or other neural network based technique.

Figure 3:
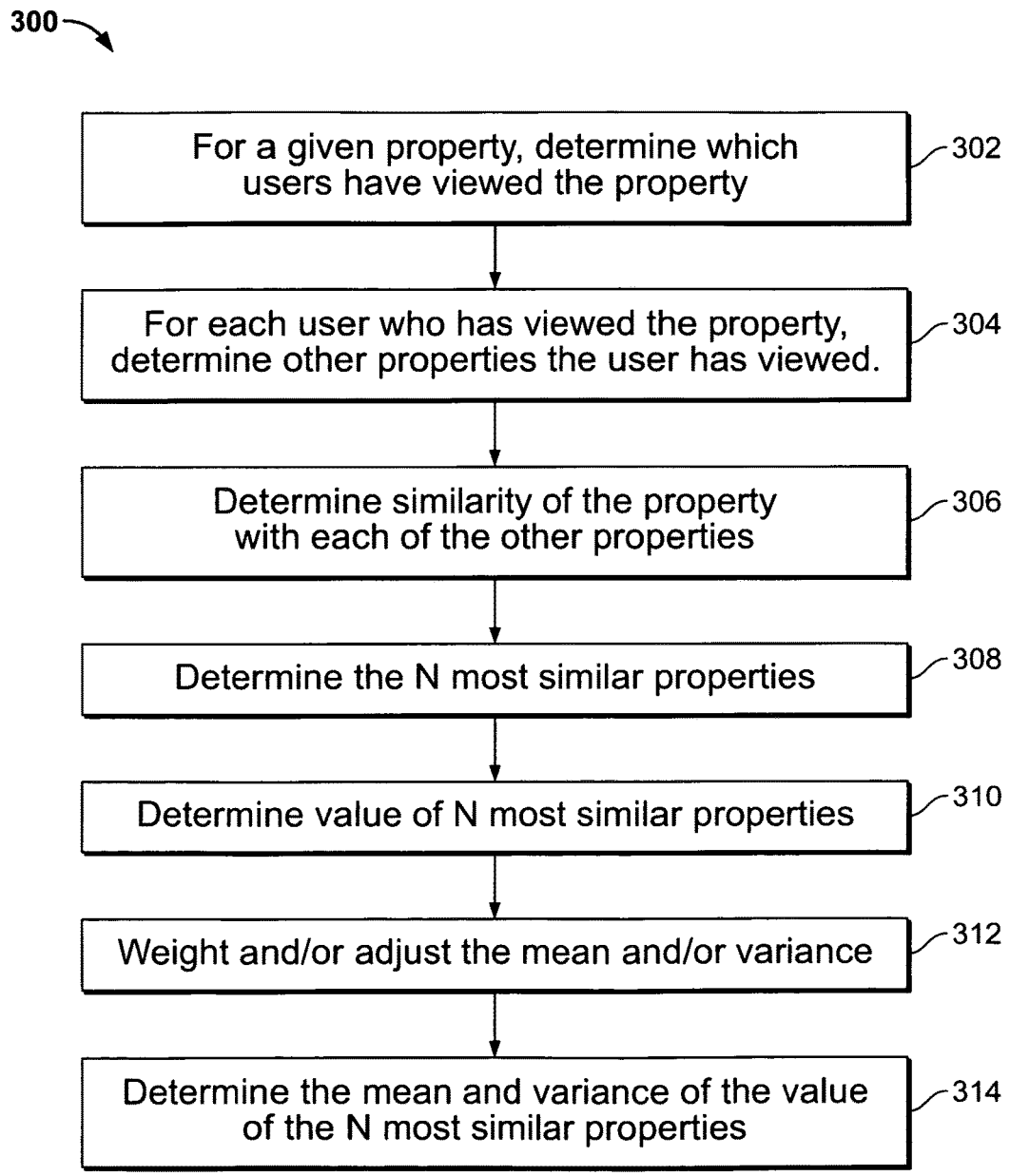
FIG. 3 is a flow chart illustrating an embodiment of a process for processing user-generated data using a data model.

FIG. 3 is a flow chart illustrating an embodiment of a process for processing user-generated data using a data model. In this example, the user-generated data is user activity data and the data model determines comparable properties to a target property and computes a mean and variance for those properties. For example, in system 100, comparables data model 110 may perform this process. Process 300 is merely an example of one way a data model might process user-generated data. In other embodiments, any of a variety of techniques may be used.

In the example shown, at 302, for a given property, it is determined which users have viewed the property. For example, if system 100 is part of a real estate website, it is determined which users of the real estate website have viewed the property. This may be done by parsing log files, for example. At 304, for each user who has viewed the property, other properties the user has viewed is determined. In some embodiments, the other properties are selected based on certain criteria, such as those within a certain neighborhood and that have been sold within a given time period. In some embodiments, other properties the user has viewed are only determined for those users who meet certain criteria, such as users who have identified themselves as prospective buyers.

At 306, a similarity of the property with each of the other properties determined at 304 is determined. For example, a covariance is computed between the pattern of user clicks on the property with that of each of the other properties. The property having the largest covariance with the target property is the most similar property. One method for approximating the covariance of the properties is the Tanimoto Distance:

$$T = \frac{\|AB\|^2}{\|A\|^2 + \|B\|^2 - \|AB\|^2}$$

At 308, the N most similar properties are determined. For example, if N is 5, the five properties having the highest covariance of click patterns with the target property are determined. At 310, the value of the N most similar properties is determined. For example, the value may be the sales value brought up to a present value, or some estimated value according to a given definition. At 312, the values are optionally weighted or adjusted. For example, if there is a pool on one property, but not the others, that property value might be adjusted. Additionally, the present value of the property could be determined. For example, the property value might be adjusted based on sales trends since the date the property was last sold. A downward trend, for example, would bring the value down. At 314, the mean and variance of the values associated with the N most similar properties is determined.

In some embodiments, one or more of the most similar properties are recommended to a user viewing a web page associated with the target property. For example, a box with the text "Other recommended properties" may be displayed with one or more of the recommend properties listed.

In other embodiments, the technique that is used to determine similar properties to a target property can also be used to determine similar neighborhoods to a neighborhood in which a target property is located. This may be used to determine comparable neighborhoods by comparable neighborhood ratings data model 112, for example.

Figure 4:
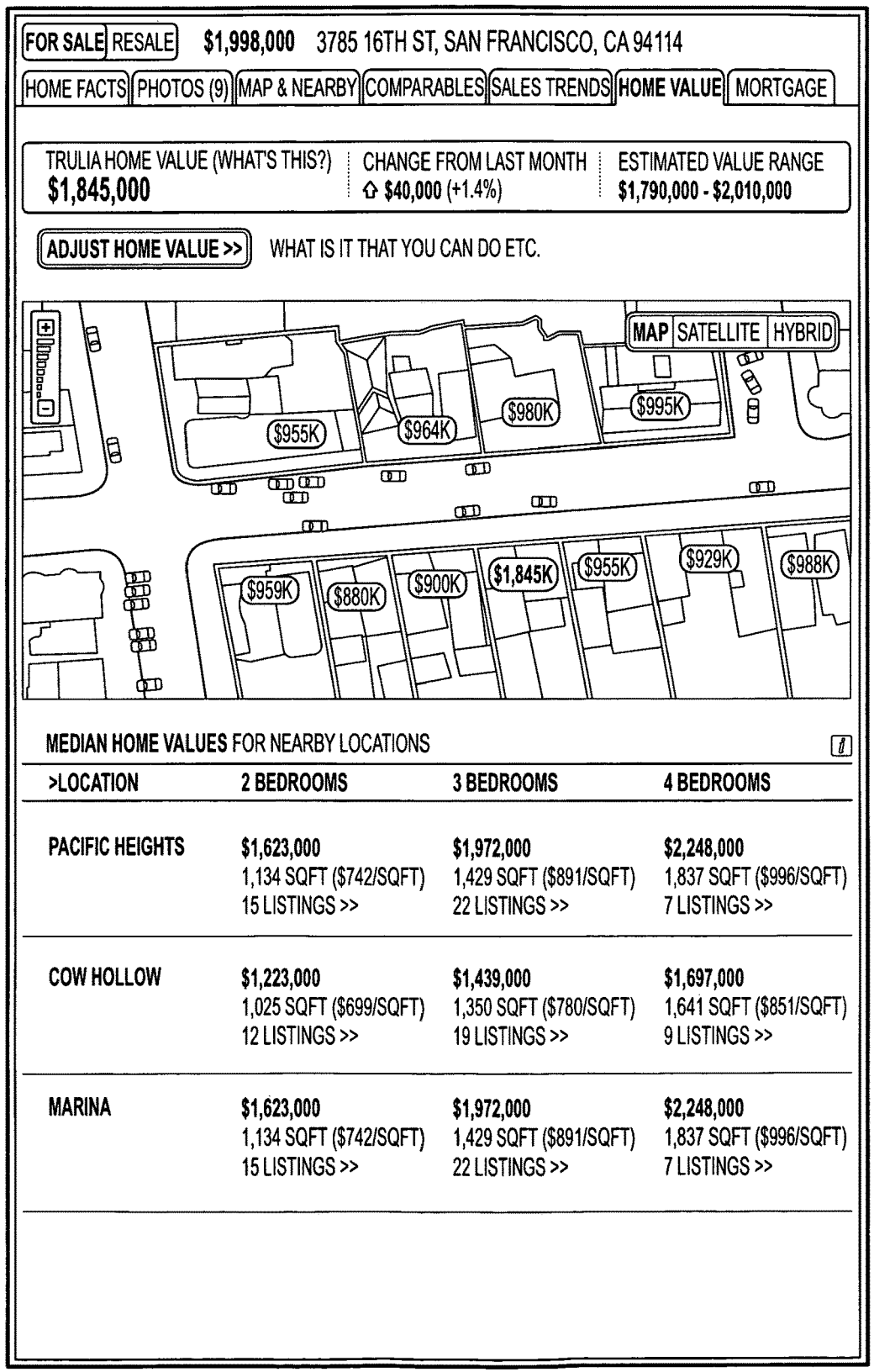
FIG. 4 is a diagram illustrating an embodiment of an interface for viewing an estimated property valuation.

FIG. 4 is a diagram illustrating an embodiment of an interface for viewing an estimated property valuation. For example, this interface may be provided as part of a real estate website that allows users to search for and view properties. In this example interface, the property at 3785 16$^{th}$ St, San Francisco, Calif. 94114 is being displayed. "Trulia Home Value" indicates an estimated valuation of the property being viewed, in this case $1,845,000. In addition, the change from last month and an estimated value range are shown. A user may select the "Adjust home value" button to modify various contributing factors that go into the estimated valuation, as more fully described below.

In various embodiments, estimated valuations may be used to provide a variety of information to the user. For example, in the example interface shown, a map showing the estimated valuation of the target property and neighboring properties is displayed. "Median home values for nearby locations" shows the median estimated valuations for properties in nearby neighborhoods having 2, 3, and 4 bedrooms, respectively.

FIGS. 5A-B show a diagram illustrating an embodiment of an interface for adjusting an estimated property valuation. In some embodiments, this interface opens in response to a user selecting the "Adjust home value" button in FIG. 4. As shown in this interface, the original (prior to user adjustment) estimated valuation is shown in box 502 in the left hand column as "Original value $1,845,000". A plurality of contributing factors to the estimated valuation may be individually selected and/or modified in three sections, including: property facts ("Adjust home facts"), property improvements ("Refine the value by adding home improvements"), and comparable properties ("Choose comparable homes"). A user may adjust data associated with one or more of these contributing factors to adjust or modify the estimated valuation. In some embodiments, such as the example shown, the adjusted estimated valuation is updated dynamically (e.g., in response to user adjustments) in box 504 in the left hand column as "Adjusted value $1,930,000". In this example, box 504 also shows a breakdown of how much each contributing factor affected the adjusted estimated valuation. How much each contributing factor affects the adjusted estimated valuation is also shown in each section.

By allowing the user to adjust various contributing factors, the user can clearly see how various changes/improvements will affect the property value. In some embodiments, the user adjustments are for the user's information only and not saved or publicly displayed. In other embodiments, the user adjustments may be saved and affect the original estimated valuation for all users. For example, home facts and home improvements may have an error and a user adjustment may correct the error. In some embodiments, only adjustments made by certain types of users are used to modify the original estimated valuation for all users. For example, the types might be users who are registered as a realtor, an appraiser, an inspector, and/or the owner of the property.

In various embodiments, the interface may provide tools for adjusting other contributing factors. Other contributing factors, for example, could include: comparable neighborhood ratings, local ratings/reviews, and thumbs up/down. For example, an interface for rating the property and/or neighborhood in which a property is located may be provided, in which a user may select from 1-5 stars. Various categories may be provided for rating, such as schools, crime, walkability of the neighborhood; or exterior/interior condition of the property. Reviews may be in freeform text. Thumbs up/down may be a thumb icon that a user can click to indicate that a user agrees/disagrees with or likes/dislikes some data or information associated with a property or neighborhood. Any or all of this user-generated data can be used to adjust the estimated valuation.

In this example interface, a user may opt to adjust any one of more of a plurality of contributing factors by editing the data in the appropriate section of the interface. In other embodiments, other interfaces could be used. For example, a list of contributing factors may be provided and a user may need to checkmark which of the contributing factors the user would like to modify. In some embodiments, the user can weight the different contributing factors, for example, using slider bars. For example, a user might believe that comparables have a great effect on value than improvements, in which case the user might give a greater weight to the comparables data.

In some embodiments, this user-adjusted data may be fed into the appropriate data model(s) shown in evaluation system 100 of FIG. 1. For example, in this interface, the home facts data and home improvements data could be provided as input to the hedonics data model 104. Comparable properties data could be provided as input to comparables model 110. For example, "Choose comparable homes" could display the most similar properties, in order from most to least similar. By default, the N most similar properties are checkmarked. The checkmarked properties are then used as input to the data model to determine the estimated valuation. By checkmarking various properties, the user can customize the estimated valuation to only take into account the check marked properties as comparables.

In this example interface, home facts data and home improvements data are examples of objective or fact-based data that is fed into one or more fact-based data models in system 100. Comparable homes data is an example of subjective or user-generated data that is fed into one or more data models associated with user-generated data in system 100. In some cases, a user might want to override the user-generated/subjective data and want to know the estimated valuation based on fact-based data alone. In some embodiments, the interface includes an element that allows the user to override the subjective data.

In some embodiments, the interface includes an element that allows the user to adjust between a collective assessment and a personal assessment. For example a slider bar may be presented that allows the user to adjust between All (or N) to 1 users, where "All" (or "N") means that all (or N) users' user-generated data is used to compute the estimated valuation, and "1" means that only the user's user-generated data is used to compute the estimated valuation. A user might find this useful, for example, if the user is interested in a fact-based estimated valuation that takes into account only the user's opinions on, for example, which homes to consider as comparables (as selected by the user under "Choose comparable homes"), or the user's rating of the neighborhood or of the condition of the home.

In some embodiments, one or more visual cues are used to indicate whether data is the user's data or all users's data. For example, if there is a section for providing and displaying ratings of various categories associated with the property, the user's rating may be displayed along with other users' average rating for each category. In some embodiments, colors may be used to indicate whether data is the user's data or all users' data. For example, there could be a slider bar to adjust between a collective assessment and a personal assessment. When the setting is "1", the rating is shown in one color; when the setting is "All" the rating is shown in a different color.

Figure 6:
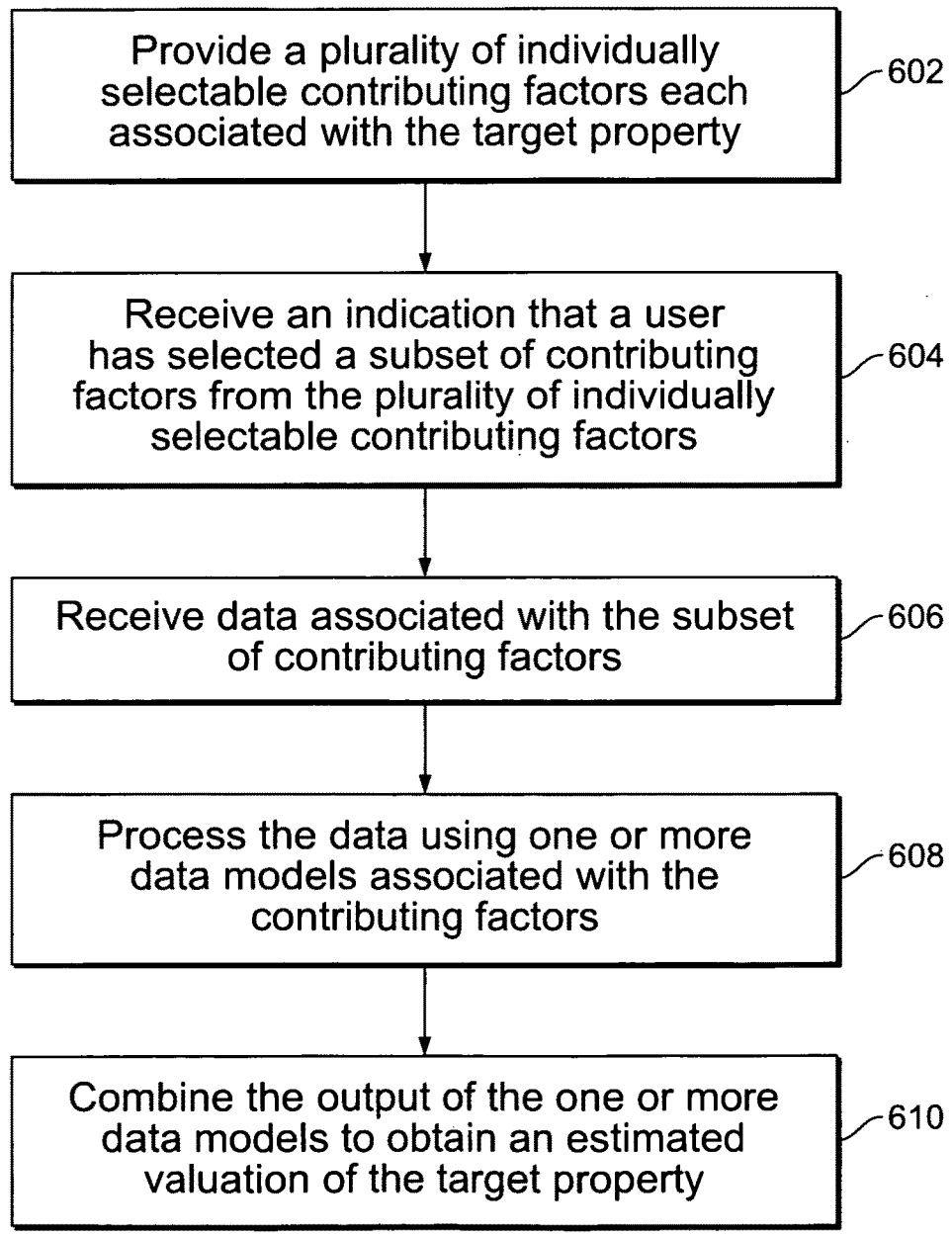
FIG. 6 is a flow chart illustrating an embodiment of a process for estimating a valuation of a target property based on individually user-selectable contributing factors.

FIG. 6 is a flow chart illustrating an embodiment of a process for estimating a valuation of a target property based on individually user-selectable contributing factors. In some embodiments, this process is performed by system 100.

In the example shown, at 602, a plurality of individually selectable contributing factors each associated with the target property are provided or displayed. For example, interface 500 is displayed, in which the individually selectable contributing factors are: property facts, property improvements, and comparables. At 604, an indication that a user has selected a subset of contributing factors from the plurality of individually selectable contributing factors is received. For example, in interface 500, a user may select a subset of contributing factors by editing one or more of the property facts, home improvements, or comparables. In this example, if the user does not edit the home improvements section, home improvements is not selected as a contributing factor. In other embodiments, a list of contributing factors and editable data associated with each contributing factor is provided and a user may select (e.g., checkmark) one or more of the contributing factors from the list. Those that are checkmarked are considered selected. At 606, data associated with the subset of contributing factors is received. For example, in interface 500, a user may edit one or more of the property facts, home improvements, or comparables with new data. At 608, the data is processed using one or more data models associated with the contributing factors. For example, the new data entered by the user at 606 may be processed by the appropriate data models in valuation system 100. At 610, the output of the one or more data models is combined to obtain or compute an estimated valuation of the target property. For example, the data processed at 606 may be combined by aggregator 118 to compute the estimated valuation.

Figure 7A:
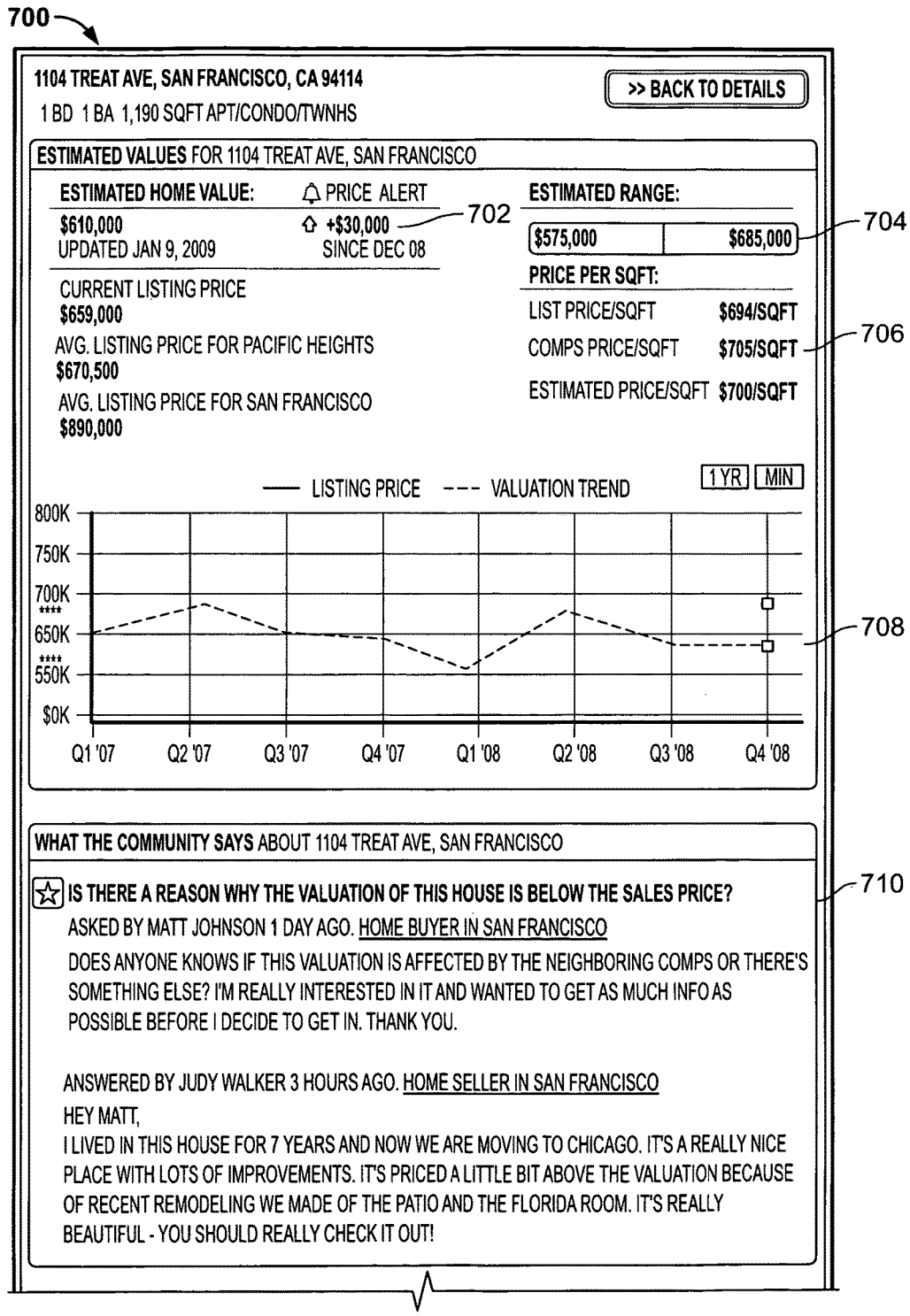
FIG. 7A-7B is a diagram illustrating an embodiment of an interface for displaying various data obtained based on an estimated property valuation(s).
Figure 7B:
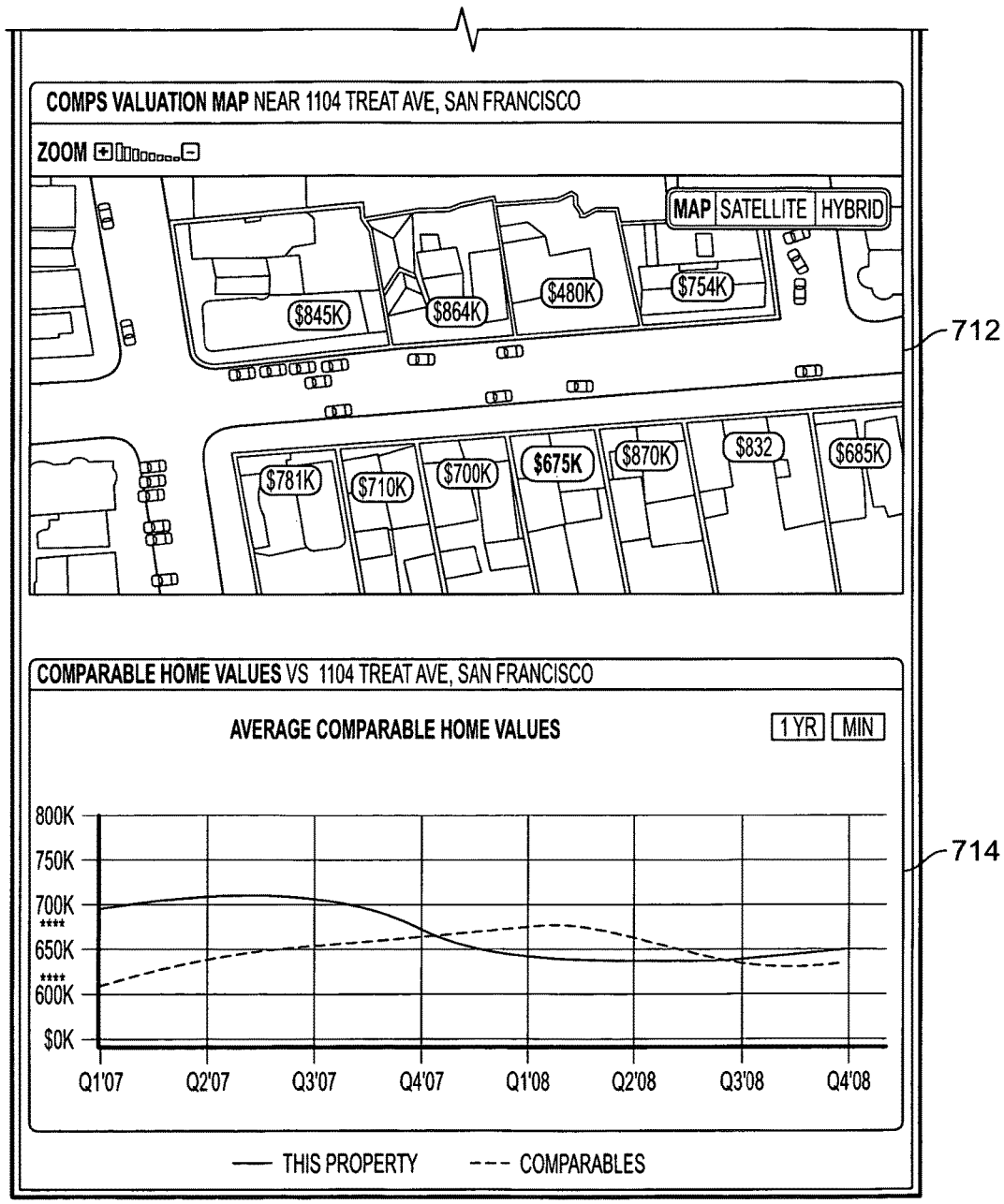

FIG. 7A-7B is a diagram illustrating an embodiment of an interface for displaying various data obtained based on an estimated property valuation(s). Interface 700 shows examples of various data that can be computed based on the estimated property valuation(s) for a particular property (1104 Treat Ave., San Francisco, Calif. 94114). For example, a change in estimated valuation 702 from an earlier date can be displayed. A range of the estimated valuation 704 can be displayed. For example, system 100 may output a low and high for the estimated valuation, where the low and high could be, for example, one standard deviation away from the mean (estimated valuation). An estimated price per square foot 706 could be computed based on the estimated valuation divided by the square footage of the property for each of the target property and comparable properties. A plot of the estimated valuation over time 708 could be computed and displayed, where the estimated valuation is computed for each date corresponding to each data point in the plot. A discussion associated with the estimated valuation 710 among one or more users could be provided. A map 712 showing the estimated valuation of the target property and neighboring properties could be displayed. A plot of comparable home values over time 714 could be displayed. Plot 714 could be computed by averaging estimated valuations of comparable homes at each date in the plot. Comparable homes can be defined in various ways in various embodiments. For example, some embodiments may define comparable homes according to process 300. In various embodiments, a variety of other data can be computed based on the estimated valuation and presented in various tools and interfaces.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A valuation system for estimating a valuation of a target property comprising a non-transitory computer-readable medium having instructions stored thereon, which when executed by one or more processors of the valuation system cause the valuation system to:
   receive, at the one or more processors, user traffic activity information concerning property information included in the website, wherein the user traffic activity comprises information of a first set of users each of whom has accessed a property web page for a target property;
   identify, by the one or more processors, a set of properties other than the target property whose property web page was accessed by at least a threshold number of users in the first set of users;
   select, by the one or more processors, a group of comparable properties for the target property from the set of identified properties based on the user-traffic activity of each of the threshold number of users in the first set of users;
   retrieve, from a memory coupled to the one or more processors, property data regarding the group of comparable properties;
   receive, by the one or more processors, actively provided user-generated data, including user reviews on the website of a neighborhood of the target property from a second set of users, wherein the user reviews concern a set of categories regarding the neighborhood;
   receive, by the one or more processors, fact-based data comprising data not based on user activity or user input;
   process, by the one or more processors, the property data using a first data model to obtain a first valuation of the target property;
   process, by the one or more processors, the user reviews using a second data model to obtain a second valuation of the target property;
   subject, by the one or more processors, the fact-based data to a third data model to obtain a third valuation of the target property,
   wherein at least one of the first data model, the second data model, or the third data model is configured to process only one among the property data, the user-generated data, and the fact-based data; and
   combine, by the one or more processors, the obtained first, second, and third valuations to obtain a collective estimated valuation of the target property; and
   display, at an interface, the collective estimated valuation of the target property.

2. The system as recited in claim 1, wherein the user traffic activity includes user click patterns or browsing habits/history.

3. The system as recited in claim 1, wherein the valuation system is further configured to receive, by the one or more processors, thumb up/down data regarding the target property, wherein the thumb up/down data comprises a user agreement or disagreement with an estimated value of the target property.

4. The system as recited in claim 1, wherein combining includes using a weighted average of the output of the one or more data models to obtain an estimate valuation of the target property.

5. The system as recited in claim 1, wherein the valuation system is further configured to process, by the one or more processors, fact-based data and user-generated data using a data model that is configured to process both fact-based data and user-generated data.

6. The system as recited in claim 1, wherein the valuation system is further configured to:
   receive, by the one or more processors, an indication of weights associated with the first set of users or the second set of users; and
   adjust, by the one or more processors, the output of the first data model or the second data model using the weights before the combining.

7. The system as recited in claim 6, wherein the indication is received through a slider bar on the display that enables the current user to adjust the weights between "all users" and "one user" and wherein for "one user," the adjusting includes giving a weight only to information related to the target user, and for "all users," the adjusting includes giving a weight information related to all of the first or second set of users.

8. The system as recited in claim 6, wherein the indication of weights includes giving a larger weight to a user review of one of the second of users who lives in the neighborhood.

9. The system as recited in claim 1, wherein the valuation system is further configured to process, by the one or more processors, user-generated data with at least one user-defined data model.

10. The system as recited in claim 1, wherein the valuation system is further configured to receive, by the one or more processors, user-selected subset of individually selectable contributing factors selected from a plurality of individually selectable contributing factors.

11. The system as recited in claim 10, wherein combining outputs of the first and second data models is based on the user-selected subset of individually selectable contributing factors.

12. The system as recited in claim 1, wherein the passively provided user-generated data includes a popularity of the target property based on an amount of traffic the Web information regarding the target property receives and a time on market of the target property.

13. The system as recited in claim 1, wherein selecting the group of comparable properties using the user traffic activity comprises calculating a similarity between the target property and each of the set of properties.

14. The system as recited in claim 1, wherein the group of comparable properties is further identified by determining a present value of one of the set of properties.

15. The system as recited in claim 1, wherein the combining of the outputs of the first and second data models to obtain a collective estimated valuation of the target property comprises using an aggregator, wherein the aggregator uses a perceptron that has been trained to determine the collected estimated valuation of the target property based on the outputs of the first and second data models.

16. A method for estimating a valuation of a target property, comprising:
   receiving by one or more processors, user traffic activity information concerning property information included in a real estate website, wherein the user traffic activity comprises information of a first set of users each of whom has accessed a property web page for the target property;
   using the user traffic activity to identify, by the one or more processors, a set of properties other than the target property whose property web page was accessed by at least a threshold number of users in the first set of users;
   using the user traffic activity to select, by the or more processors, a group of comparable properties for the target property from the set of identified properties based on the user-traffic activity of each of the threshold number of users in the first set of users;
   retrieving, from a memory coupled to the one or more processors, property data regarding the group of comparable properties;
   processing, using the one or more processors, the property data regarding the group of comparable properties using a data model to obtain a valuation of the target property; and
   causing the obtained valuation of the target property to be displayed at at least one interface coupled to the one or more processors.

17. A computer program product for estimating a valuation of a target property, the computer program product being embodied in a non-transitory computer readable medium and comprising computer instructions for:
   receiving, by one or more processors, user traffic activity information concerning property information included in a real estate website, wherein the user traffic activity comprises information of a first set of users each of whom has accessed a property web page for the target property;
   identifying, by the one or more processors, a set of properties other than the target property whose property web page was accessed by at least a threshold number of users in the first set of users;
   selecting, by the one or more processors, a group of comparable properties for the target property from the set of identified properties based on the user-traffic activity of each of the threshold number of users in the first set of users;
   retrieving, from a memory coupled to the one or more processors, property data regarding the group of comparable properties;
   receiving, by the one or more processors, actively provided user-generated data, including user reviews on the website of a neighborhood of the target property from a second set of users, wherein the user reviews concern a set of categories regarding the neighborhood;
   processing, by the one or more processors, the property data using a first data model to obtain a first valuation of the target property;
   processing, by the one or more processors, the user reviews using a second data model to obtain a second valuation of the target property;
   combining, by the one or more processors, the obtained first and second valuations to obtain a collective estimated valuation of the target property; and
   causing the collective estimated valuation of the target property to be displayed at at least one interface coupled to one or more processors.

* * * * *

UNITED STATES PATENT AND TRADEMARK OFFICE
CERTIFICATE OF CORRECTION

PATENT NO. : 10,380,653 B1  
APPLICATION NO. : 12/924037  
DATED : August 13, 2019  
INVENTOR(S) : Flint et al.

Page 1 of 1

It is certified that error appears in the above-identified patent and that said Letters Patent is hereby corrected as shown below:

On the Title Page

Page 5, in Column 2, under "Other Publications", Line 31, delete "Microstraqtegy," and insert -- Microstrategy, --, therefor.

In the Specification

In Column 1, Line 40, delete "FIG." and insert -- FIGS. --, therefor.
In Column 4, Line 55, delete "etc.)'s" and insert -- etc.) --, therefor.
In Column 8, Line 31, delete "users's" and insert -- user's --, therefor.
In Column 9, Line 9, delete "FIG." and insert -- FIGS. --, therefor.

In the Claims

In Column 11, Line 36, in Claim 16, delete "receiving" and insert -- receiving, --, therefor.
In Column 11, Line 46, in Claim 16, delete "the" and insert -- the one --, therefor.

Signed and Sealed this  
Twenty-sixth Day of November, 2019

Andrei Iancu  
*Director of the United States Patent and Trademark Office*